(12) United States Patent
Sun et al.

(10) Patent No.: US 11,991,668 B2
(45) Date of Patent: May 21, 2024

(54) RESOURCE SELECTION FOR APERIODIC CONFIGURED GRANT UPLINK COMMUNICATION

(71) Applicant: QUALCOMM Incorporated, San Diego, CA (US)

(72) Inventors: Jing Sun, San Diego, CA (US); Tao Luo, San Diego, CA (US); Yisheng Xue, San Diego, CA (US); Xiaoxia Zhang, San Diego, CA (US); Juan Montojo, San Diego, CA (US); Peter Gaal, San Diego, CA (US); Ozcan Ozturk, San Diego, CA (US); Rajat Prakash, San Diego, CA (US); Iyab Issam Sakhnini, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 194 days.

(21) Appl. No.: 17/304,515

(22) Filed: Jun. 22, 2021

(65) Prior Publication Data

US 2022/0007336 A1    Jan. 6, 2022

Related U.S. Application Data

(60) Provisional application No. 63/046,810, filed on Jul. 1, 2020.

(51) Int. Cl.
| | |
|---|---|
| *H04W 72/02* | (2009.01) |
| *H04L 1/00* | (2006.01) |
| *H04W 72/0446* | (2023.01) |
| *H04W 72/0453* | (2023.01) |
| *H04W 72/23* | (2023.01) |

(52) U.S. Cl.
CPC .......... *H04W 72/02* (2013.01); *H04L 1/0003* (2013.01); *H04W 72/0446* (2013.01); *H04W 72/0453* (2013.01); *H04W 72/23* (2023.01)

(58) Field of Classification Search
CPC ............. H04W 72/02; H04W 72/0446; H04W 72/0453; H04W 72/23; H04W 72/52; H04L 1/0003
See application file for complete search history.

(56) References Cited

U.S. PATENT DOCUMENTS

| | | | |
|---|---|---|---|
| 10,412,754 B2 * | 9/2019 | Khoryaev | H04W 72/1263 |
| 2019/0069319 A1 * | 2/2019 | Arshad | H04W 72/23 |
| 2020/0077437 A1 * | 3/2020 | Stern-Berkowitz | H04W 72/044 |

(Continued)

OTHER PUBLICATIONS

Spreadtrum Communications, "Tx resource pool configuration in Mode 1", 3GPP TSG-RAN WG2 Meeting #110-e, R2-2005044 available on Jun. 12, 2020 (Year: 2020).*

*Primary Examiner* — Thinh D Tran
(74) *Attorney, Agent, or Firm* — Harrity & Harrity LLP

(57) ABSTRACT

Various aspects of the present disclosure generally relate to wireless communication. In some aspects, a user equipment may receive a configuration of a resource pool for configured grant uplink communications and one or more parameters for identifying a resource set from the resource pool, wherein the resource set is a subset of resources in the resource pool; identify the resource set of the resource pool based at least in part on the one or more parameters; and transmit a configured grant uplink communication in a resource selected from the resource set. Numerous other aspects are provided.

24 Claims, 8 Drawing Sheets

(56) References Cited

U.S. PATENT DOCUMENTS

| | | |
|---|---|---|
| 2021/0058968 A1* | 2/2021 | Xue .................. H04L 5/0092 |
| 2021/0400712 A1 | 12/2021 | Sun et al. |
| 2021/0410129 A1* | 12/2021 | Freda .................. H04W 76/18 |
| 2022/0132516 A1* | 4/2022 | Hwang .................. H04L 5/0057 |
| 2022/0217736 A1* | 7/2022 | Taherzadeh Boroujeni ................ H04W 72/0446 |
| 2022/0393802 A1* | 12/2022 | Zhao .................. H04W 72/23 |
| 2022/0408461 A1* | 12/2022 | Lei .................. H04W 72/23 |

* cited by examiner

RESOURCE SELECTION FOR APERIODIC CONFIGURED GRANT UPLINK COMMUNICATION

CROSS-REFERENCE TO RELATED APPLICATION

This Patent application claims priority to U.S. Provisional Patent Application No. 63/046,810, filed on Jul. 1, 2020, entitled "RESOURCE SELECTION FOR APERIODIC CONFIGURED GRANT UPLINK COMMUNICATION," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for resource selection for aperiodic configured grant uplink communication.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a UE includes: receiving a configuration of a resource pool for configured grant uplink communications and one or more parameters for identifying a resource set from the resource pool, wherein the resource set is a subset of resources in the resource pool; identifying the resource set of the resource pool based at least in part on the one or more parameters; and transmitting a configured grant uplink communication in a resource selected from the resource set.

In some aspects, a method of wireless communication performed by a base station includes: transmitting, to a UE, a configuration of a resource pool for configured grant uplink communications and one or more parameters for identifying a resource set from the resource pool, wherein the resource set is a subset of resources in the resource pool; and receiving, from the UE, a configured grant uplink communication in a resource of the resource set identified based at least in part on the one or more parameters.

In some aspects, a UE for wireless communication includes: a memory; and one or more processors coupled to the memory, the memory and the one or more processors configured to: receive a configuration of a resource pool for configured grant uplink communications and one or more parameters for identifying a resource set from the resource pool, wherein the resource set is a subset of resources in the resource pool; identify the resource set of the resource pool based at least in part on the one or more parameters; and transmit a configured grant uplink communication in a resource selected from the resource set.

In some aspects, a base station for wireless communication includes: a memory; and one or more processors coupled to the memory, the memory and the one or more processors configured to: transmit, to a UE, a configuration of a resource pool for configured grant uplink communications and one or more parameters for identifying a resource set from the resource pool, wherein the resource set is a subset of resources in the resource pool; and receive, from the UE, a configured grant uplink communication in a resource of the resource set identified based at least in part on the one or more parameters.

In some aspects, a non-transitory computer-readable medium storing a set of instructions for wireless communication includes: one or more instructions that, when executed by one or more processors of a UE, cause the UE to: receive a configuration of a resource pool for configured grant uplink communications and one or more parameters for identifying a resource set from the resource pool, wherein the resource set is a subset of resources in the resource pool; identify the resource set of the resource pool based at least in part on the one or more parameters; and transmit a configured grant uplink communication in a resource selected from the resource set.

In some aspects, a non-transitory computer-readable medium storing a set of instructions for wireless communication includes: one or more instructions that, when executed by one or more processors of a base station, cause the base station to: transmit, to a UE, a configuration of a resource pool for configured grant uplink communications and one or more parameters for identifying a resource set from the resource pool, wherein the resource set is a subset of resources in the resource pool; and receive, from the UE, a configured grant uplink communication in a resource of the resource set identified based at least in part on the one or more parameters.

In some aspects, an apparatus for wireless communication includes: means for receiving a configuration of a resource pool for configured grant uplink communications and one or more parameters for identifying a resource set from the resource pool, wherein the resource set is a subset of resources in the resource pool; means for identifying the resource set of the resource pool based at least in part on the one or more parameters; and means for transmitting a configured grant uplink communication in a resource selected from the resource set.

In some aspects, an apparatus for wireless communication includes: means for transmitting, to a UE, a configuration of a resource pool for configured grant uplink communications and one or more parameters for identifying a resource set from the resource pool, wherein the resource set is a subset of resources in the resource pool; and means for receiving, from the UE, a configured grant uplink communication in a resource of the resource set identified based at least in part on the one or more parameters.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, radio frequency (RF) chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
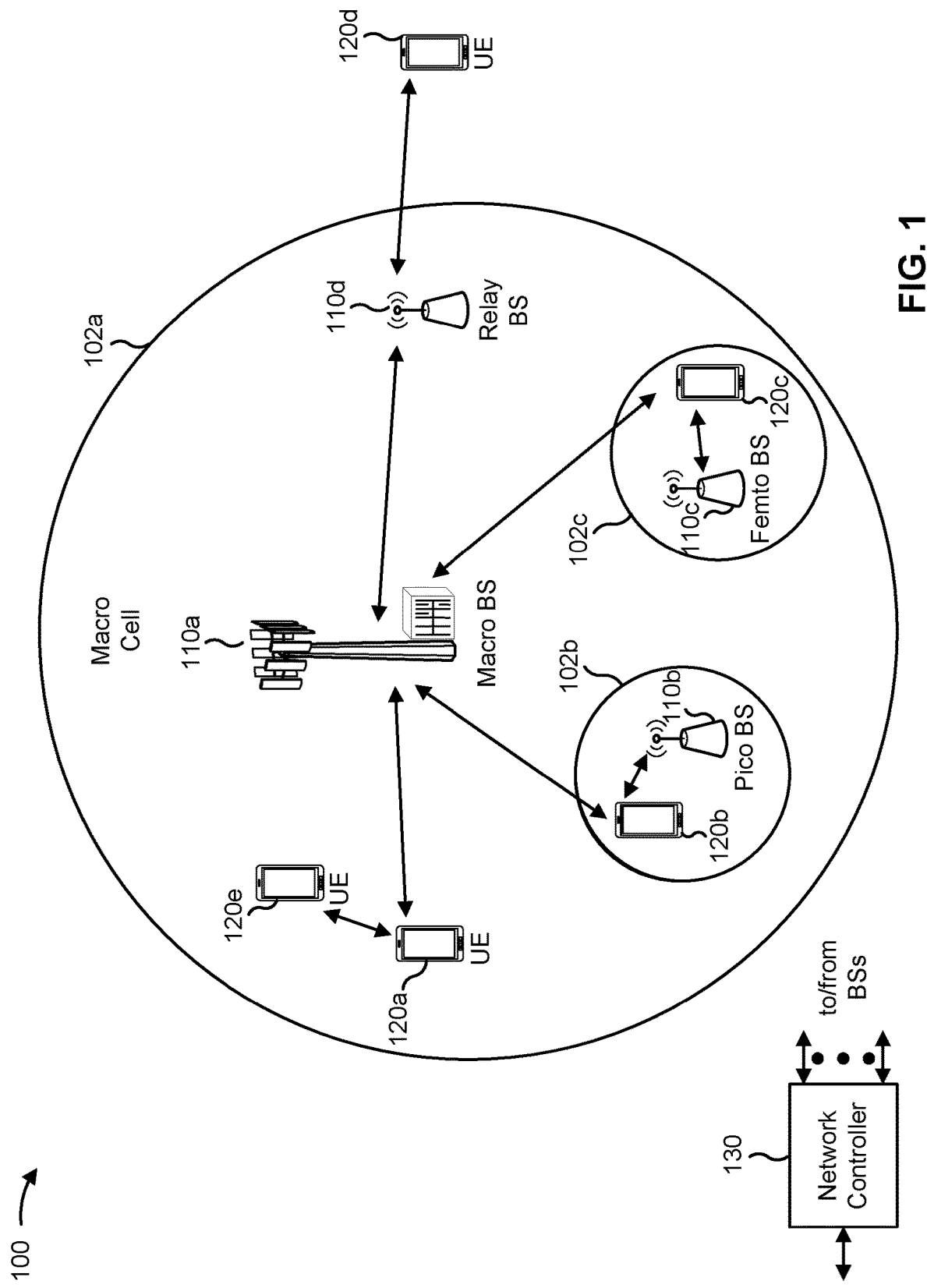
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peerto-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
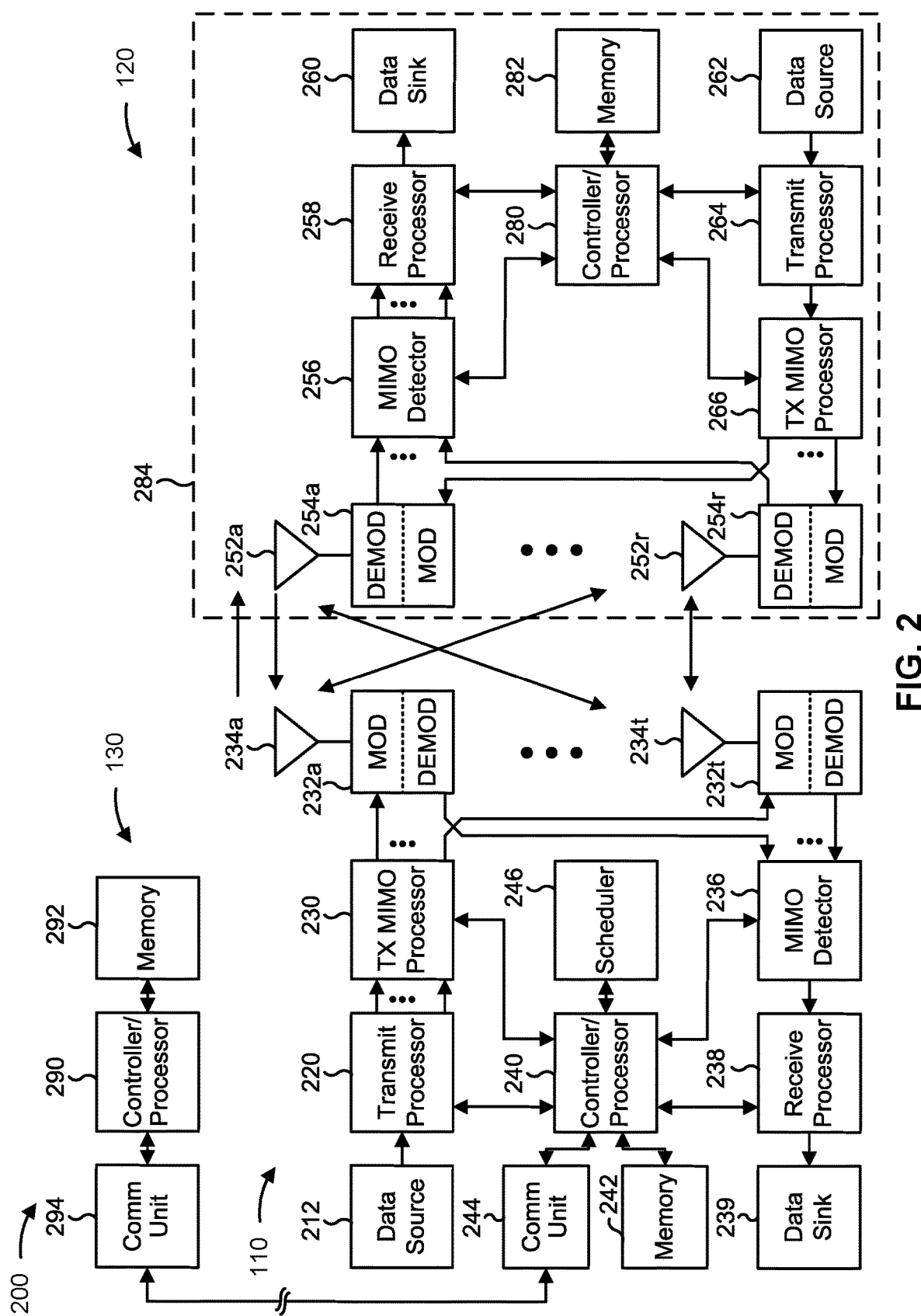
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 4-8).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 4-8).

Controller/processor 240 of base station 110, controller/processor 280 of UE 120, and/or any other component(s) of FIG. 2 may perform one or more techniques associated with resource selection for aperiodic configured grant uplink communication, as described in more detail elsewhere herein. For example, controller/processor 240 of base station 110, controller/processor 280 of UE 120, and/or any other component(s) of FIG. 2 may perform or direct operations of, for example, process 700 of FIG. 7, process 800 of FIG. 8, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 700 of FIG. 7, process 800 of FIG. 8, and/or other processes as described herein. In some aspects, executing instructions may include running the instructions, converting the instructions, compiling the instructions, and/or interpreting the instructions, among other examples.

In some aspects, UE 120 may include means for receiving a configuration of a resource pool for configured grant uplink communications and one or more parameters for identifying a resource set from the resource pool, wherein the resource set is a subset of resources in the resource pool, means for identifying the resource set of the resource pool based at least in part on the one or more parameters, means for transmitting a configured grant uplink communication in a resource selected from the resource set, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for transmitting, to a UE, a configuration of a resource pool for configured grant uplink communications and one or more parameters for identifying a resource set from the resource pool, wherein the resource set is a subset of resources in the resource pool, means for receiving, from the UE, a configured grant uplink communication in a resource of the resource set identified based at least in part on the one or more parameters, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Some UEs may be associated with a reduced capability relative to a baseline UE (e.g., an enhanced mobile broadband (eMBB) UE and/or the like). For example, a reduced capability (RedCap) UE, an Internet of Things (IoT) UE, a machine-type communication (MTC) UE, an NR Light UE, and/or the like may be associated with a reduced capability relative to an eMBB UE. A RedCap UE may be used for an industrial wireless sensor, a video surveillance device, a smart wearable device, and/or the like. A RedCap UE may have a lower communicative capacity, relative to a baseline UE (e.g., an eMBB UE and/or the like). For example, a RedCap UE may be limited in terms of maximum bandwidth (e.g., 5 MHz, 10 MHz, 20 MHz, and/or the like), maximum transmission power (e.g., 20 dBm, 14 dBm, and/or the like), number of receive antennas (e.g., 1 receive antenna, 2 receive antennas, and/or the like), and/or the like. A RedCap UE may also have a prolonged battery life, relative to a baseline UE (e.g., an eMBB UE and/or the like). RedCap UEs may co-exist with UEs implementing protocols such as eMBB, ultra-reliable low latency communication (URLLC), LTE NB-IoT/MTC, and/or the like. In some aspects, RedCap UEs, such as industrial wireless sensors, may be associated with intensive uplink traffic, moderate reliability and latency (e.g., non-URLLC), small packet size with a relatively long TX interval (e.g., low data rate), and high capacity (e.g., up to 1 UE per square meter).

In some cases, a UE may use a dynamic grant for uplink communication, wherein the UE receives information specifying a resource for a transmission to be performed by the UE. However, in some cases, such as with a large quantity of reduced-capability UEs, dynamic grant based communications may challenge a capacity of a physical downlink control channel (PDCCH). In some cases, a UE may use a configured grant for uplink communication, wherein the configured grant may be configured using configuration information that specifies a recurring grant for an uplink transmission of the UE.

Figure 3:
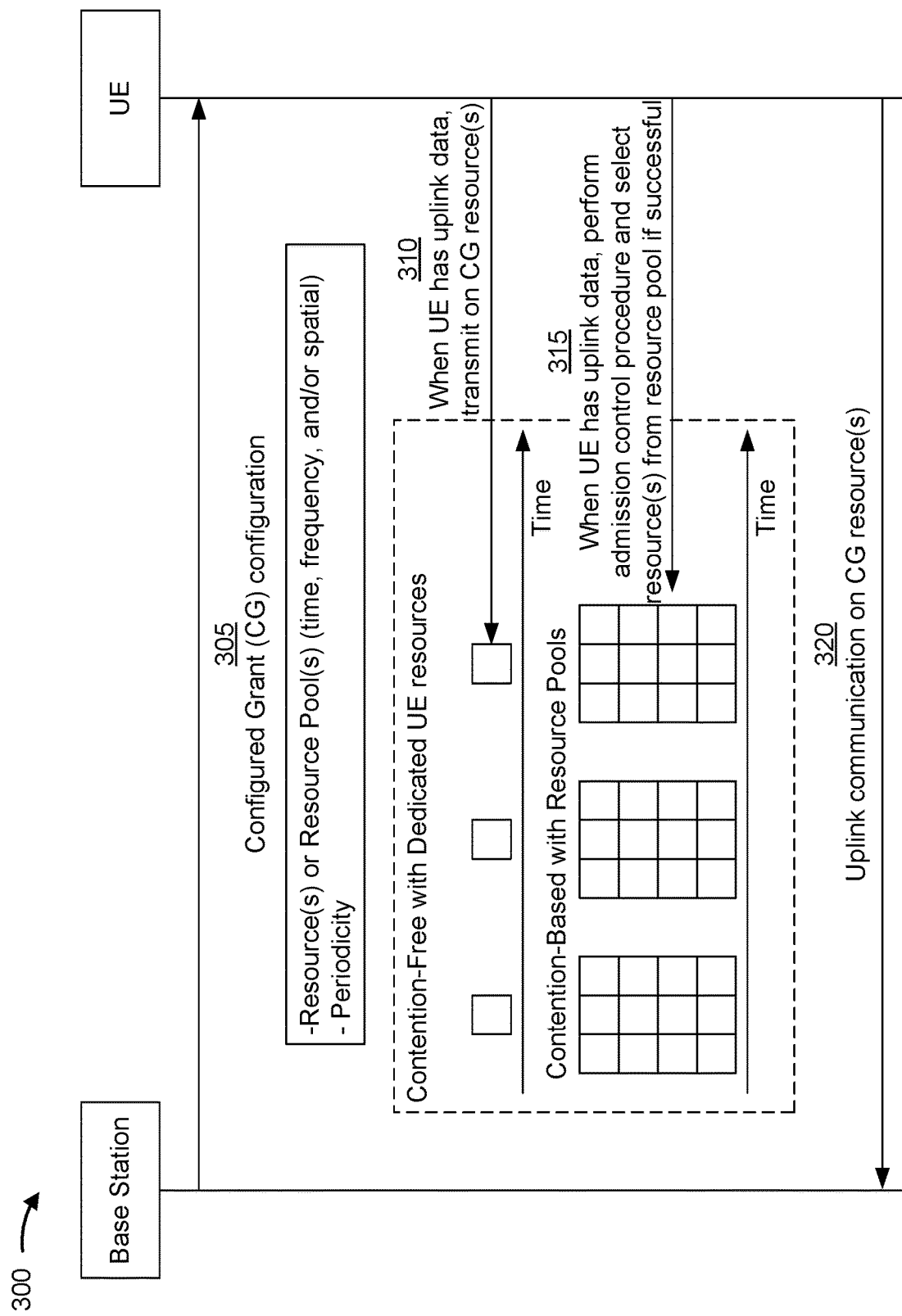
FIG. 3 is a diagram illustrating an example of configured grant (CG) communication, in accordance with the present disclosure.

FIG. 3 is a diagram illustrating an example 300 of configured grant (CG) communication, in accordance with the present disclosure. As shown, example 300 includes a base station and a UE.

As shown in FIG. 3, and by reference number 305, the base station may transmit a CG configuration to the UE. For example, the base station may transmit configuration information (e.g., in a radio resource configuration (RRC) message, in a downlink control information message, and/or the like) that identifies the CG. In some aspects, the configuration information identifying the CG may indicate a resource allocation (e.g., in a time domain, frequency domain, spatial domain, code domain, and/or the like), a periodicity associated with the resource allocation, and/or the like. The CG may identify a resource or set of resources available to the UE for transmission of an uplink communication (e.g., data, control information, and/or the like). For example, the CG configuration may identify a resource allocation for a physical uplink shared channel (PUSCH). In some aspects, the CG configuration may identify a resource pool or multiple resource pools that may be available to the UE for an uplink transmission.

In some aspects, the CG configuration may configure contention-free CG communication with resources dedicated for the UE to transmit uplink communications. In this case, the CG configuration may indicate a resource allocation (e.g., in a time domain, frequency domain, spatial domain, code domain, and/or the like) dedicated for the UE to use to transmit uplink communications. In some aspect, the CG configuration may configure the resource allocation for the UE to occur periodically, such that the resource allocation corresponds to periodically occurring transmission time occasions.

As shown in FIG. 3, and by reference number 310, when the UE has uplink data to transmit, the UE transmits the uplink data in the CG resources identified by the CG configuration. For example, the UE transmits the uplink data in one of the CG uplink occasions identified in the CG configuration using the configured resource allocation.

A CG configuration with regular periodic CG uplink occasions with a dedicated resource allocation for the UE may be convenient for a UE with periodic uplink traffic (e.g., with trivial jitter). The CG configuration may configure the periodicity associated with the resource allocation to associate CG uplink occasions with periodic nominal arrival times at which traffic to be transmitted to the base station is expected to arrive at (or be ready to be transmitted by) the UE. However, the actual arrival times at which the traffic arrives (or is ready to be transmitted) by the UE may be different than the nominal arrival times, and this difference in times is known as jitter. In some aspects, traffic jittering may be handled by configuring multiple CGs around the nominal arrival times. In some aspects, multiple opportunities for the UE to transmit the uplink communication may be defined within a CG uplink occasion. The UE may be configured with multiple CG uplinks to allow the UE to repeatedly transmit the CG uplink communications and increase the likelihood that the base station receives the communications. NR CG uplink may depend on dynamic grant re-transmission. In some aspects, to suppress a quantity of dynamic grants, the CG can be configured with blind re-transmissions via multiple repetitions per occasion.

In some cases, CG configurations with dedicated resources allocated per UE may be inefficient. For example, CG configurations with dedicated UE resources for a large number of UEs may result in consumption of an excessive amount of PUSCH resources. In this case, a considerable portion of the PUSCH resources may be inefficiently utilized, which reduces system capacity. For example, when multiple CG configurations for a UE are used for de-jittering, only a subset of CG resources may be effectively utilized. In another example, when multiple transmission opportunities are defined per CG uplink occasion, only one opportunity may be effectively utilized. In yet another example, when a blind repetition scheme is used for re-transmissions, a packet may have been already decoded after the first one or more repetitions (early decoding) such that a remainder of the repetitions are unnecessary. Unlike a downlink case, this type of inefficient consumption of system resources cannot be addressed by scheduling, as the base station does not know exactly when traffic will arrive at the UEs.

In some aspects, statistical multiplexing schemes may be used to allocate CG uplink resource access among multiple UEs. Statistical multiplexing of CG uplink communications from multiple UEs may be useful in cases in which there are a high number of UEs associated with somewhat random traffic arrivals at the base station, cases in which a traffic arrival density for traffic arriving at the UEs is time varying, and/or the like. For example, statistical multiplexing of CG uplink communications from multiple UEs may be useful for a network deployment, such as an industrial wireless sensor network, with a large capacity of UEs. In such cases, the uplink traffic associated with at least a group of UEs may be delay insensitive.

As shown in FIG. 3, the CG configuration may configure contention-based CG communication with resource pools that are available for multiple UEs to use to transmit uplink communications. The contention-based CG configuration uses statistical multiplexing to share the resource pools among multiple UEs. A resource pool includes multiple resources (e.g., in a time domain, frequency domain, spatial domain, code domain, and/or the like) that can be allocated for uplink transmission for one or more UEs. For example, an x-axis of an illustrated resource pool may indicate transmission times and a y-axis of the illustrated resource pool may indicate resources (e.g., frequency domain, spatial domain, code domain, and/or the like) that can be allocated at each transmission time. In some aspects, the same resource pools may be configured for multiple UEs.

Statistical multiplexing schemes may involve spreading control and overloading control. For example, spreading relates to distributing traffic (as interference to others) into a resource pool. In a specific example, direct spreading CDMA may be utilized in legacy 3G systems. NR systems which rely on an OFDMA network may utilize organized randomized resource selection, in which the base station can identify sources that contribute to collisions in a resource pool and/or local overloading of a resource pool.

Overloading control relates to controlling a level of multiplexing within a stable region. For example, overly aggressive multiplexing may result in an unusable resource pool. Rise over thermal (RoT) based control (in addition to power control) may be utilized in legacy 3G systems. In 3GPP, a central scheduler may be used to assign grants to respective UEs. In 3GPP2, a hybrid approach may be used in which an access network sends a reverse link activity bit to guide autonomous rate selection at respective UEs. Channel busy ratio (CBR) based control may be utilized in NR sidelink. For example, each sidelink UE may autonomously measure CBR and regulate its channel use based at least in part on the measured CBR.

As further shown in FIG. 3, and by reference number 315, for the contention-based CG configuration, when the UE has uplink data to be transmitted, the UE performs an admission control procedure and selects one or more resources from the resource pool if the admission control procedure is successful. In some aspects, the admission control procedure may include the UE selecting a random number (e.g., between 0 and 1 or some other range), comparing the random number and a threshold, and determining whether the random number satisfies the threshold. If the random number satisfies the threshold, then the admission is successful and the UE selects a resource from the resource pool to transmit the uplink communication.

In some aspects, the base station may control the probability of the UE accessing the resource pool by setting and/or adjusting the threshold. For example, the base station may dynamically adjust the threshold to permit more or fewer UEs to access the resource pool in order to prevent resource collisions. Additionally, or alternatively, the base station may assign different thresholds to be used by different UEs.

Based at least in part on the UE determining that the random number satisfies the threshold, the UE may select a resource from the resource pool to transmit the uplink communication. The UE may select the resource from the resource pool using randomized and/or pseudo-randomized resource selection. For example, the UE may use a hashing function based at least in part on a UE identifier, time, and/or resource pool index to select the resource from the resource pool.

As further shown in FIG. 3, and by reference number 320, the UE transmits the uplink communication to the base station on the CG resource. For example, the UE may transmit the uplink communication as a PUSCH communication using a resource allocation identified by the CG.

As described above, multiple UEs may be configured to share the same resource pool, and the access probability may be controlled by the base station. In a case in which too many UEs try to access the resource pool, this admission control mechanism allows the base station to adjust the admission threshold such that each UE will have a lower probability to access the resources in a CG uplink transmission occasion of the resource pool. This technique for CG uplink communication fits a use case in which there is a low density of UEs in a coverage area of a base station and the UEs have close to periodic arrival of traffic that approximately corresponds to the CG uplink occasions in the resource pool. However, in a case in which UE traffic arrival is more random (e.g., not periodic), CG uplink occasions in a resource pool may not correspond with arrival of traffic for a UE, which may result in delayed CG uplink communications, inefficient allocation of resources for CG uplink communications, and/or additional control signaling overhead. This may cause a decrease in network speed, reliability, and/or the like, and consume additional computing resources (e.g., processing resources, memory resources, communication resources, and/or the like), networking resources, and/or the like dealing with the delayed CG uplink communications, inefficient allocation of resources for CG uplink communications, and/or additional control signaling overhead.

Some techniques and apparatuses described herein enable a base station to configure a resource pool with one or more continuous bursts of resources and parameters for identifying a resource set from the resource pool, and enable a UE to identify a resource set from the resource pool based at least in part on the parameters and transmit a CG uplink communication in a resource selected from the resource set. As a result, the UE can select a resource from a resource set identified from the resource pool in response to traffic arrival associated with the UE, even if the traffic arrival does not correspond to a pre-configured CG uplink occasion. This reduces delay of CG uplink communications, inefficiency, and control signaling overhead, thus increasing network speed, reliability, and/or the like, and conserving computing resources (e.g., processing resources, memory resources, communication resources, and/or the like), networking resources, and/or the like.

As indicated above, FIG. 3 is provided as an example. Other examples may differ from what is described with respect to FIG. 3.

Figure 4:
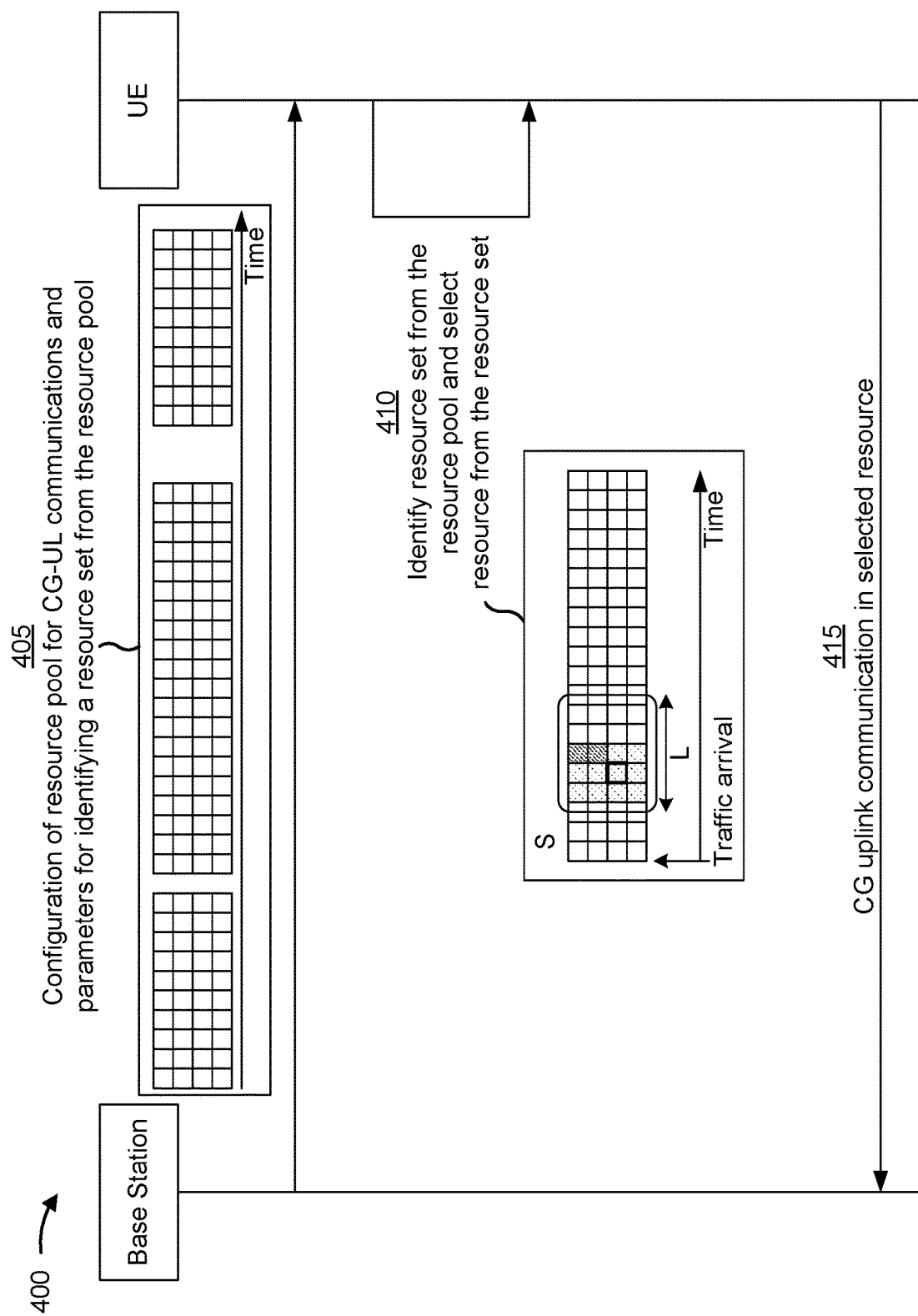
FIGS. 4-6 are diagrams illustrating examples associated with resource selection for aperiodic CG uplink communication, in accordance with the present disclosure.

FIG. 4 is a diagram illustrating an example 400 associated with resource selection for aperiodic CG uplink communication, in accordance with the present disclosure. As shown in FIG. 4, example 400 includes communication between a base station 110 and a UE 120. The base station 110 and the UE 120 may be included in a wireless network, such as wireless network 100 illustrated and described above in connection with FIG. 1. The base station 110 and the UE 120 may communicate on a wireless access link, which may include an uplink and a downlink.

As shown in FIG. 4, and by reference number 405, the base station 110 may transmit, to the UE 120, a configuration of a resource pool for CG uplink communication and parameters for identifying a resource set from the resource pool. For example, the base station 110 may transmit, to the UE 120, configuration information (e.g., radio resource configuration (RRC) information, downlink control information, and/or the like) that identifies the resource pool for CG uplink communications and the parameters for identifying a resource set from the resource pool. The resource pool may include multiple resources (e.g., time domain resources, frequency domain resources, spatial domain resources, code domain resources, and/or the like) that can be allocated for CG uplink communication by the UE 120. The resources in the resource pool may be time division multiplexed, frequency division multiplexed, code division multiplexed, and/or the like, from each other. In some aspects, the resources in the resource pool may be code division multiplexed, with overlapping time and/or frequency resources separated in a spatial domain with different DMRS ports and/or different DMRS sequences.

In some aspects, the resource pool may have a continuous allocation of resources in the time domain. In some aspects, the resource pool may include one or more bursts of resources, with each burst of resources including a continuous stream of resources in the time domain. In this case, the base station 110 may use times between the bursts of resources for downlink communications and/or for dynamically scheduling uplink communications. In some aspects, the bursts of resources in the resource pool may not be configured into periodic CG uplink occasions, but instead may provide continuous streams of resources from which the UE 120 can identify a resource set from which to select a resource to transmit a CG uplink communication. This may enable the UE 120 to identify a resource set and select a resource from the resource set in response to traffic arrival (e.g., aperiodic traffic arrival) at the UE 120.

The configuration information transmitted to the UE 120 may be UE-specific, such that a UE-specific resource pool is configured for the UE 120. In some aspects, multiple UEs (e.g., the UE 120 and one or more other UEs) may share the same resource pool. The resource pool may be homogeneous to the UE 120, for example, with respect to a transport block size, MCS, time domain resource size, and/or frequency domain resource size. For example, different resources for the UE 120 in the resource pool may have the same transport block size, the same MCS, the same time domain frequency resource size, and/or the same frequency domain resource size.

The configuration information may include one or more parameters for identifying a resource set from the resource pool. The resource set may be a subset of resources in the resource pool that is identified by the UE 120, and from which a resource may be selected for transmitting a CG uplink communication by the UE 120. The parameters for identifying the resource set may include at least one of a start parameter S that relates to a start time for the resource set, a length parameter L that relates to a time length of the resource set, a resource quantity parameter X that relates to a number of resources in the resource set, or a combination thereof. In some aspects, the start parameter S, together with the length parameter L and/or the resource quantity parameter X, may be used to define a time window. In this case, the resource set may be identified as a subset of resources in the resource pool in that time window. The base station 110 may determine the parameters (e.g., L, X, and/or S) to set a size of the time window that defines the resource set. The base station 110 may set the parameters to balance overloading of the resource pool and delay of CG uplink communications. For example, a larger time window may reduce the chances of overloading the resource pool but may lead to a longer delay for CG uplink communications.

In some aspects, the configuration information may include values for the start parameter S and the length parameter L. In some aspects, the configuration information may include values for the start parameter S and the resource quantity parameter X. In some aspects, the configuration information may include values for the start parameter S, the length parameter L, and the resource quantity parameter X. In some aspects, the configuration information may include values for the start parameter S, the length parameter L, a minimum resource quantity parameter Xmin, and a maximum resource quantity parameter Xmax.

In some aspects, the base station 110 may set one or more additional parameters in the configuration information to control overloading of the resource pool. For example, the configuration information may include a minimum access gap, which is a time period, after the UE 120 accesses the resource pool, during which the UE 120 is barred from accessing the resource pool again. This may be used to prevent the UE 120 from overloading a resource pool shared by the UE 120 and other UEs with multiple CG uplink communications in a short time period.

As further shown in FIG. 4, and by reference number 410, the UE 120 may identify a resource set from the resource pool and select a resource from the resource set. The UE 120 may identify a resource set from the resource pool and select a resource from the resource set in response to a triggering event related to a CG uplink communication. The triggering event may be any event that causes the UE 120 to request access to the resource pool to transmit a CG uplink communication. For example, the triggering event may be arrival, at the UE 120, of data to be transmitted in a CG uplink communication. Additionally, and/or alternatively, the triggering event may be preparation, creation, selection, or the like, by the UE 120, of data to be transmitted in a CG uplink communication.

The UE 120 may identify the resource set from the resource pool based at least in part on the one or more parameters, for identifying the resource set, included in the configuration information. The resource set may be identified as a subset of resources in the resource pool in a time window defined by the parameters for identifying the resource set. As described above, in some aspects, the parameters for identifying the resource set may include one or more of the start parameter S, the length parameter L, and/or the resource quantity parameter X. The start parameter S may indicate an offset between the triggering event (e.g., arrival of data to be transmitted in a CG uplink communication) and a start time for the time window that defines the resource set. The length parameter L may indicate a time length of the time window that defines the resource set. The resource quantity parameter X may indicate a threshold for a number of resources in the resource set. In some aspects, the parameters for identifying the resource set may include the minimum resource quantity parameter Xmin and/or the maximum resource quantity parameter Xmax. The minimum resource quantity parameter Xmin may indicate a constraint for a minimum number of resources in the resource set. The maximum resource quantity parameter Xmax may indicate a constraint for the maximum number of resources in the resource set.

In some aspects, the UE 120 may identify the resource set from the resource pool based at least in part on the start parameter S and the length parameter L. In this case, values for the start parameter S and the length parameter L may be included in the configuration information. The UE 120 may identify the resource set as a subset of resources in the resource pool in a time window with a start time determined based at least in part on the start parameter S and a time length determined based at least in part on the length parameter L. For example, as shown in FIG. 4, the start parameter S may indicate an offset between a triggering event (e.g., traffic arrival) and the start of the time window, and the length parameter L may indicate the time length of the time window. The length parameter L may be used (e.g., together with the start parameter S) to control a delay between the triggering event and the transmission of the CG uplink communication in a resource selected from the resource set to be in an acceptable range.

In some aspects, the UE 120 may identify the resource set from the resource pool based at least in part on the start parameter S and the resource quantity parameter X. In this case, values for the start parameter S and the resource quantity parameter X may be included in the configuration information. The UE 120 may identify the resource set as a subset of resources in the resource pool in a time window with a start time determined based at least in part on the start parameter S and a time length determined based at least in part on the resource quantity parameter X. For example, the start parameter S may indicate an offset between a triggering event (e.g., traffic arrival) and the start of the time window. The time length of the time window may be determined such that the number of resources included in the time window satisfies the resource quantity parameter X. The resource quantity parameter X may be used to control a size of the resource set to decrease a likelihood of collisions (e.g., transmission of CG uplink communications by the UE 120 and one or more other UEs using the same resource).

In some aspects, the UE 120 may identify the resource set from the resource pool based at least in part on the start parameter S, the length parameter L, and the resource quantity parameter X. In this case, values for the start parameter S, the length parameter L, and the resource quantity parameter X may be included in the configuration information. The UE 120 may identify the resource set as a first subset of resources in a first time window with a start time determined based at least in part on the start parameter S and a time length determined based at least in part on the length parameter L, in response to a determination that the number of the resources in the first subset does not satisfy the resource quantity parameter X. The UE 120 may identify the resource set as a second subset of resources in a second time window with a start time determined based at least in part on the start parameter S and a time length determined based at least in part on the resource quantity parameter X, in response to a determination that the number of the resources in the first subset satisfies the resource quantity parameter X. For example, the first time window may have a time length of L. If the first subset of resources defined by the first time window has fewer than X resources, the first subset of resources defined by the first time window may be identified as the resource set. The second time window may define the second subset of resources to include the first X resources in the first time window. If the first subset of resources defined by the first time window has more than X resources, the second subset of resources defined by the second time window may be identified as the resource set.

In some aspects, the UE 120 may identify the resource set from the resource pool based at least in part on the start parameter S, the length parameter L, a minimum resource quantity parameter Xmin, and a maximum resource quantity parameter Xmax. In this case, values for the start parameter S, the length parameter L, the minimum resource quantity parameter Xmin, and the maximum resource quantity parameter Xmax may be included in the configuration information. The UE 120 may identify the resource set as a subset of resources in a shifting time window with a start time determined based at least in part on the start parameter S and a time length determined based at least in part on the length parameter L, the minimum resource quantity parameter Xmin, and the maximum resource quantity parameter Xmax. For example, the time length of the time window may be determined based at least in part by the length parameter L, subject to a constraint that the number of resources in the time window is greater than or equal to the minimum resource quantity parameter Xmin and less than or equal to the maximum resource quantity parameter Xmax.

In response to identifying the resource set from the resource pool, the UE 120 selects a resource from the resource set. The resource set includes a subset of resources in the resource pool. The UE 120 may randomly select a resource for transmission of a CG uplink communication from the subset of resources included in the resource set.

As further shown in FIG. 4, and by reference number 415, the UE 120 may transmit, to the base station 110, a CG uplink communication in the resource selected from the resource set. For example, the UE 120 may transmit the CG uplink communication as a CG PUSCH communication using the selected resource. In some aspects, the UE 120 may transmit CG uplink control information (CG-UCI) with a UE identifier associated with the UE 120 in the CG PUSCH communication, so that the base station 110 can identify which UE 120 is transmitting from the results of decoding the CG PUSCH communication.

Configuring a resource pool with one or more continuous bursts of resources and parameters for identifying a resource set from the resource pool, as described in connection with FIG. 4, enables the UE 120 to identify a resource set from the resource pool in response to a triggering event (e.g., arrival of data to be transmitted in a CG uplink communi-cation) and transmit a CG uplink communication in a resource selected from the resource set. As a result, delay of CG uplink communications, inefficiency, and/or control signaling overhead may be reduced, thus increasing network speed, reliability, or the like, and conserving computing resources (e.g., processing resources, memory resources, and/or communication resources) and networking resources, among other examples.

As indicated above, FIG. 4 is provided as an example. Other examples may differ from what is described with respect to FIG. 4.

Figure 5:
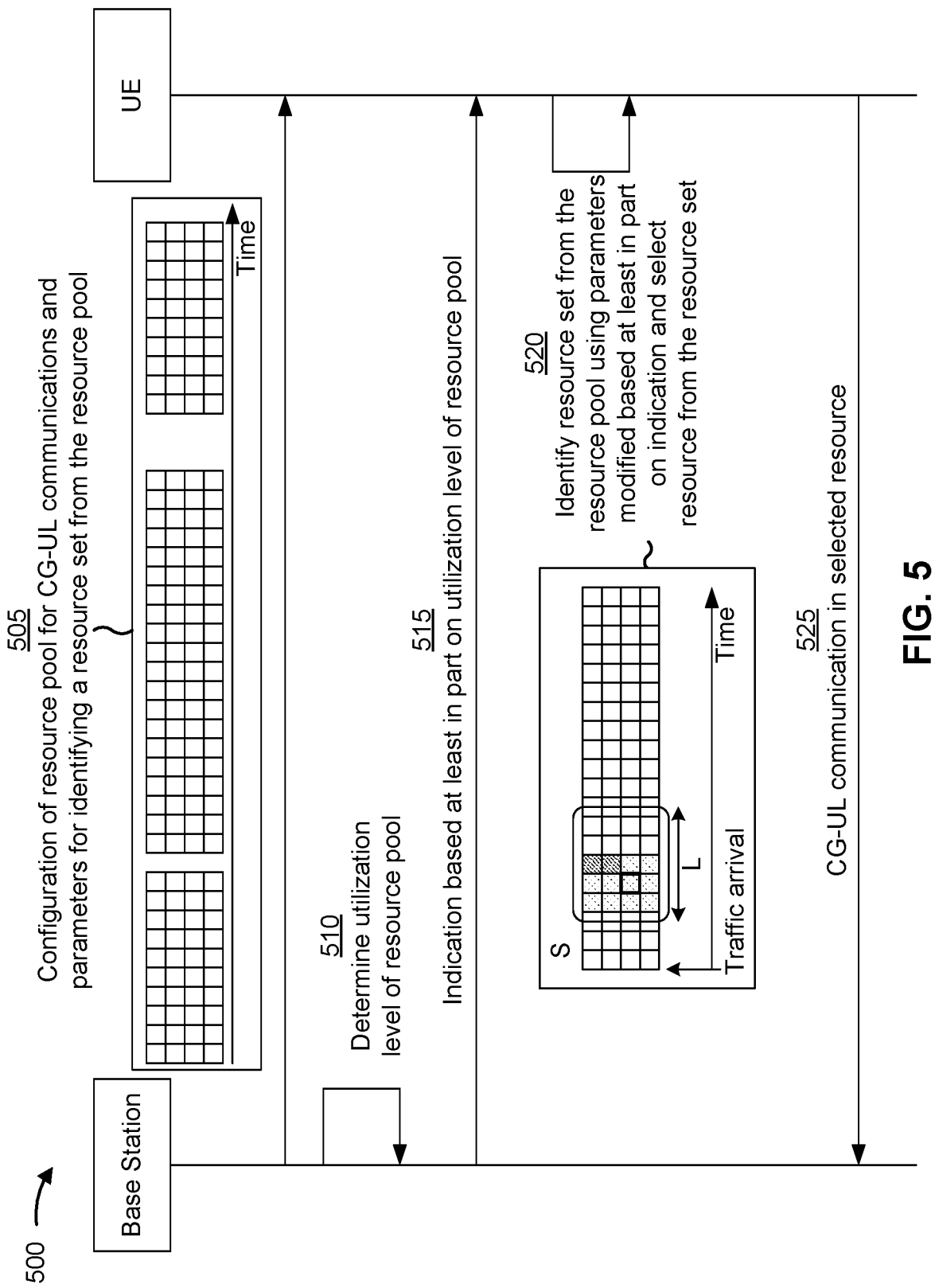

FIG. 5 is a diagram illustrating an example 500 associated with resource selection for aperiodic CG uplink communication, in accordance with the present disclosure. As shown in FIG. 5, example 500 includes communication between a base station 110 and a UE 120. The base station 110 and the UE 120 may be included in a wireless network, such as wireless network 100 illustrated and described above in connection with FIG. 1. The base station 110 and the UE 120 may communicate on a wireless access link, which may include an uplink and a downlink.

As shown in FIG. 5, and by reference number 505, the base station 110 may transmit, to the UE 120, a configuration of a resource pool for CG uplink communications and parameters for identifying a resource set from the resource pool. In some aspects, the base station 110 may transmit, to the UE 120, the configuration of the resource pool for CG uplink communications and the parameters for identifying a resource set from the resource pool, as described above in connection with FIG. 4.

As further shown in FIG. 5, and by reference number 510, the base station 110 may determine a utilization level of the resource pool. The base station 110 may determine the utilization level by determining the utilization of resources in the resource pool in a certain time window. For example, the base station 110 may continuously and/or periodically measure the utilization level in a recent time window of resources in the resource pool.

In some aspects, the base station 110 may determine the utilization level of the resource pool based at least in part on a RoT measurement associated with the resource pool. For example, the base station 110 may determine the RoT over the resources in the resource pool during the recent time window.

In some aspects, the base station 110 may determine the utilization level of the resource pool based at least in part on log likelihood ratios (LLRs) determined for CG uplink communications (e.g., CG uplink PUSCH communications) received in the resource pool during the recent time window. For example, the base station 110 may determine an average of the LLRs of the CG uplink communications (e.g., CG uplink PUSCH communications) received in the resource pool during the recent time window. The base station 110 may also identify which UEs (e.g., UE 120 and/or one or more other UEs) are transmitting the CG uplink communications (e.g., CG uplink PUSCH communications) received in the resource pool.

In some aspects, the base station 110 may determine the utilization level of the resource pool based at least in part on an occupancy ratio of the resources in the resource pool during the recent time window. For example, the base station 110 may determine an occupancy ratio of the resources in the spatial domain during the recent time window. The base station 110 may determine resource occupancy for the resources of the resource pool during the recent time window based at least in part on CG uplink PUSCH communication decoding, DMRS detection in CG uplink PUSCH communications, and/or CG-UCI detection in CG uplink PUSCH communications. The resource occupancy for the resources of the resource pool during the recent time window may also be adjusted based at least in part on detection of resource collision (e.g., multiple UEs transmitting CG uplink PUSCH communications in the same resource) by the base station 110. The base station 110 may also identify which UEs (e.g., UE 120 and/or one or more other UEs) are transmitting the CG uplink communications (e.g., CG uplink PUSCH communications) received in the resource pool.

As further shown in FIG. 5, and by reference number 515, the base station 110 may transmit, to the UE 120, an indication based at least in part on the utilization level of the resource pool. In some aspects, the base station 110 may transmit the indication based at least in part on a determination that the utilization level of the resources in the recent time window of the resource pool satisfies a condition. For example, the base station 110 may compare the utilization level for the recent time window of the resource pool with a threshold to determine whether the utilization level satisfies a busy condition, and transmit the indication to the UE 120 in response to a determination that the utilization level satisfies the busy condition.

In some aspects, the indication may be an indication that controls the UE 120 to modify one or more of the parameters (e.g., L, X, and/or S) for identifying the resource set from the resource pool. For example, the base station 110 may transmit an indication to modify a parameter for identifying the resource set from the resource pool in response to a determination that the utilization level satisfies a condition (e.g., a busy condition). In some aspects, the indication may control the UE 120 to adjust the length parameter L and/or the resource quantity parameter X in order to adjust a size of the time window that defines the resource set.

Adjustments to the length parameter L and/or the resource quantity parameter X cause a tradeoff between delay of CG uplink transmissions and a probability of collisions on resources of the resource set. Smaller values for the length parameter L and/or the resource quantity parameter X may lead to smaller delays for transmitting CG uplink communications, but also may result in a higher risk of collisions. The risk of collisions is higher during times in the resource pool is busy (e.g., the utilization level satisfies the busy condition). The arrival, at the UE 120 and/or one or more other UEs, of large amounts of aperiodic traffic to be transmitted in CG uplink communications in a short time period may cause the resource pool to be busy and increase the risk of collisions. Additionally, and/or alternatively, accumulation of traffic to be transmitted in CG uplink communications when CG uplink resources are unavailable in the time domain (e.g., between the bursts of resources in the resource pool) may cause the resource pool to be busy and increase the risk of collisions in resources near the beginning of a burst of resources.

In response to a determination that the utilization level of the resource pool satisfies a busy condition, the base station 110 may transmit the indication to control the UE 120 to increase the length parameter L and/or the resource quantity parameter X in order to increase a size of the time window that defines the resource set in the resource pool, and thus lower the likelihood of collisions in the resource set. For example, the indication that controls the UE 120 to modify a parameter (e.g., L, X, and/or S) for identifying the resource set may be a group common PDCCH (GC-PDCCH) communication that includes an updated value for the parameter (e.g., L, X, and/or S) to be modified. The GC-PDCCH communication may be transmitted to the UE 120 and one or more other UEs.

In some aspects, the base station 110 may transmit the indication to modify a parameter for identifying the resource set in response to a prediction of the utilization level based at least in part on previously determined utilization levels of the resource pool. For example, the base station 110 may predict that too many collisions will occur at the beginning of an upcoming burst of resources in the resource pool (e.g., due to accumulation of traffic between the burst of resources in the resource pool). In response, the base station 110 may transmit the indication (e.g., GC-PDCCH communication) to increase the length parameter L and/or the resource quantity parameter X in order to increase the size of the time window that defines the resource set. This may distribute access for traffic that accumulates before the upcoming burst of resources over a longer period of time during the upcoming burst of resources.

In some aspects, the base station 110 may transmit the indication to modify a parameter for identifying the resource set in response to a determination that the utilization level of the resource pool satisfies a not busy (e.g., underutilization) condition. For example, in response to a determination that the utilization level satisfies the not busy condition, the base station 110 may transmit an indication (e.g., GC-PDCCH communication) to decrease the length parameter L and/or the resource quantity parameter X in order to reduce a delay for transmitting a CG uplink communication.

In some aspects, the indication transmitted to the UE 120 by the base station 110 may be an indication relating to the utilization level of the resource pool. In this case, in response to a determination that the utilization level satisfies a busy condition, the base station 110 may transmit an indication that the utilization level is busy to the UE 120. In response to a determination that the utilization level satisfies a not busy condition, the base station 110 may transmit an indication that the utilization level is not busy to the UE 120. For example, the indication relating to the utilization level may be transmitted in a GC-PDCCH communication. The UE 120 may be configured to monitor a bit field of the GC-PDCCH communication for the indication relating to the utilization level of the resource pool. A first value (e.g., 1) in the bit field of the GC-PDCCH communication may be used to provide a busy indication to the UE 120, and a second value (e.g., 0) in the bit field of the GC-PDCCH communication may be used to provide a non-busy indication to the UE 120.

The UE 120 may modify one or more of the parameters (e.g., L, X, and/or S) for identifying the resource set in response to receiving the indication (e.g., GC-PDCCH communication) relating to the utilization level of the resource pool. The UE 120 may modify the length parameter L and/or the resource quantity parameter X to increase the size of the time window that defines the resource set in response to an indication that the utilization level is busy. Additionally, and/or alternatively, the UE 120 may modify the length parameter L and/or the resource quantity parameter X to decrease the size of the time window that defines the resource set in response to an indication that the utilization level is not busy. In some aspects, the UE 120 may repeatedly receive indications relating to the utilization level and increment a parameter (e.g., L, X, and/or S) in response to receiving the indications. For example, the UE 120 may increase the length parameter L and/or the resource quantity parameter X by a set increment each time a busy indication is received. The UE 120 may decrease the length parameter L and/or the resource quantity parameter X by a set increment each time a non-busy indication is received. The increments for modifying the length parameter L and/or the resource quantity parameter X may be set in the configuration information.

As further shown in FIG. 5, and by reference number 520, the UE 120 may identify a resource set from the resource pool using parameters modified based at least in part on the indication and select a resource from the resource set. In some aspects, the indication received from the base station 110 may control the UE 120 to modify one or more of the parameters (e.g., L, X, and/or S) for identifying the resource set. In some aspects, the indication received from the base station 110 may be an indication relating to the utilization level of the resource pool, and the UE 120 may modify one or more of the parameters (e.g., L, X, and/or S) in response to receiving the indication. In response to modifying the parameters for identifying the resource set, the UE 120 may identify the resource set from the resource pool using the modified parameters and select a resource for transmitting a CG uplink communication from the resource set. In some aspects, the UE 120 may identify the resource set using the modified parameters and select a resource from the resource set, as described above in connection with FIG. 4.

As further shown in FIG. 5, and by reference number 525, the UE 120 may transmit, to the base station 110, a CG uplink communication in the resource selected from the resource set. In some aspects, the UE 120 may transmit the CG uplink communication in the resource selected from the resource set, as described above in connection with FIG. 4.

Determining a utilization level of the resource pool and modifying one or more of the parameters for identifying the resource set from the resource pool based at least in part on the utilization level of the resource pool, as described in connection with FIG. 5, enables the base station 110 and/or the UE 120 to dynamically modify a time window for the resource set to reduce the likelihood of collisions in the resource pool and/or reduce delay of CG uplink communications. As a result, unreliable and/or failed uplink communications, delay, additional uplink/downlink control overhead, or the like caused by resource pool overloading may be reduced.

As indicated above, FIG. 5 is provided as an example. Other examples may differ from what is described with respect to FIG. 5.

Figure 6:
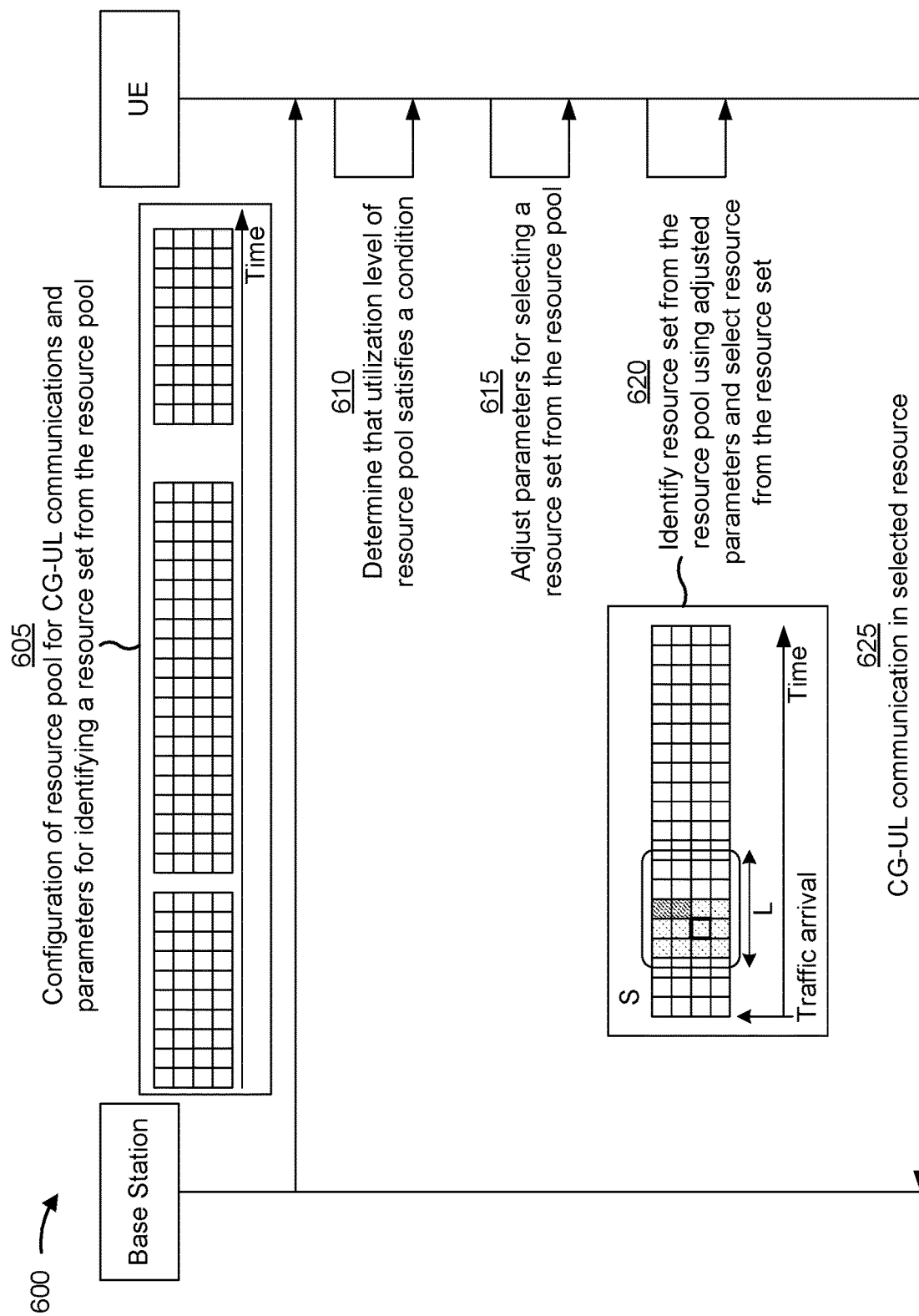

FIG. 6 is a diagram illustrating an example 600 associated with resource selection for aperiodic CG uplink communication, in accordance with the present disclosure. As shown in FIG. 6, example 600 includes communication between a base station 110 and a UE 120. The base station 110 and the UE 120 may be included in a wireless network, such as wireless network 100 illustrated and described above in connection with FIG. 1. The base station 110 and the UE 120 may communicate on a wireless access link, which may include an uplink and a downlink.

As shown in FIG. 6, and by reference number 605, the base station 110 may transmit, to the UE 120, a configuration of a resource pool for CG uplink communications and parameters for identifying a resource set from the resource pool. In some aspects, the base station 110 may transmit, to the UE 120, the configuration of the resource pool for CG uplink communications and the parameters for identifying a resource set from the resource pool, as described above in connection with FIG. 4.

As further shown in FIG. 6, and by reference number 610, the UE 120 may determine that a utilization level of the resource pool satisfies a condition. The UE 120 may detect a utilization level of the resource pool within a time window preceding an upcoming CG uplink communication and compare the utilization level with a threshold to determine whether the utilization level satisfies a condition. For example, if the utilization level of the resource pool in the time window preceding the upcoming CG uplink communication satisfies the threshold, the UE 120 may determine that the utilization level satisfies a busy condition. In some aspects, the UE 120 may also determine whether the utilization level satisfies a not busy (e.g., underutilization) condition. The UE 120 may detect the utilization level of the resource pool within the time window preceding the upcoming CG uplink communication in response to a triggering event associated with the upcoming CG uplink communication (e.g., arrival of data to be transmitted in the upcoming CG uplink communication).

In some aspects, the UE 120 may detect the utilization level of the resource pool in the time window preceding the upcoming CG uplink communication by detecting transmissions by other UEs in the resource pool and performing blind detecting to determine how many resources are used in the resource pool during the time window preceding the upcoming CG uplink transmission (e.g., a time window immediately preceding the detection of the utilization level). The UE 120 may be configured (e.g., using the configuration information received from the base station 110) with information, such as a DMRS sequence, used to detect the transmissions by the other UEs in the resource pool. The time window in which the UE 120 detects the utilization level may also be configured using the configuration information.

As further shown in FIG. 6, and by reference number 615, the UE 120 may adjust the parameters for selecting a resource set from the resource pool in response to the determination that the utilization level of the resource pool satisfies the condition. The UE 120 may adjust one or more of the parameters (e.g., L, X, and/or S in response to the determination that the utilization level satisfies the condition.

In response to detection of a busy utilization level (e.g., the utilization level satisfies the busy condition), the UE 120 may increase the length parameter L and/or the resource quantity parameter X in order to increase a size of the time window that defines the resource set in the resource pool, and thus lower the likelihood of collisions in the resource set. In response to detection of a non-busy utilization level (e.g., the utilization level satisfies the not busy condition), the UE 120 may decrease the length parameter L and/or the resource quantity parameter Xin order to decrease a size of the time window that defines the resource set in the resource pool, and thus reduce a delay for transmitting a CG uplink communication.

As further shown in FIG. 6, and by reference number 620, the UE 120 may identify a resource set from the resource pool using the adjusted parameters and select a resource from the resource set. In response to adjusting the parameters for identifying the resource set, the UE 120 may identify the resource set from the resource pool using the adjusted parameters. The UE 120 may select a resource for transmitting a CG uplink communication from the resource set identified using the adjusted parameters. In some aspects, the UE 120 may identify the resource set using the adjusted parameters and select a resource from the resource set, as described above in connection with FIG. 4.

As further shown in FIG. 6, and by reference number 625, the UE 120 may transmit, to the base station 110, a CG uplink communication in the resource selected from the resource set. In some aspects, the UE 120 may transmit the CG uplink communication in the resource selected from the resource set, as described above in connection with FIG. 4.

Determining a utilization level of the resource pool and adjusting one or more of the parameters for identifying the resource set from the resource pool based at least in part on the utilization level of the resource pool, as described in connection with FIG. 6, enables the UE 120 to dynamically modify a time window for the resource set to reduce the likelihood of collisions in the resource pool and/or reduce delay of CG uplink communications. As a result, unreliable and/or failed uplink communications, delay, additional uplink/downlink control overhead, or the like caused by resource pool overloading may be reduced.

As indicated above, FIG. 6 is provided as an example. Other examples may differ from what is described with respect to FIG. 6.

Figure 7:
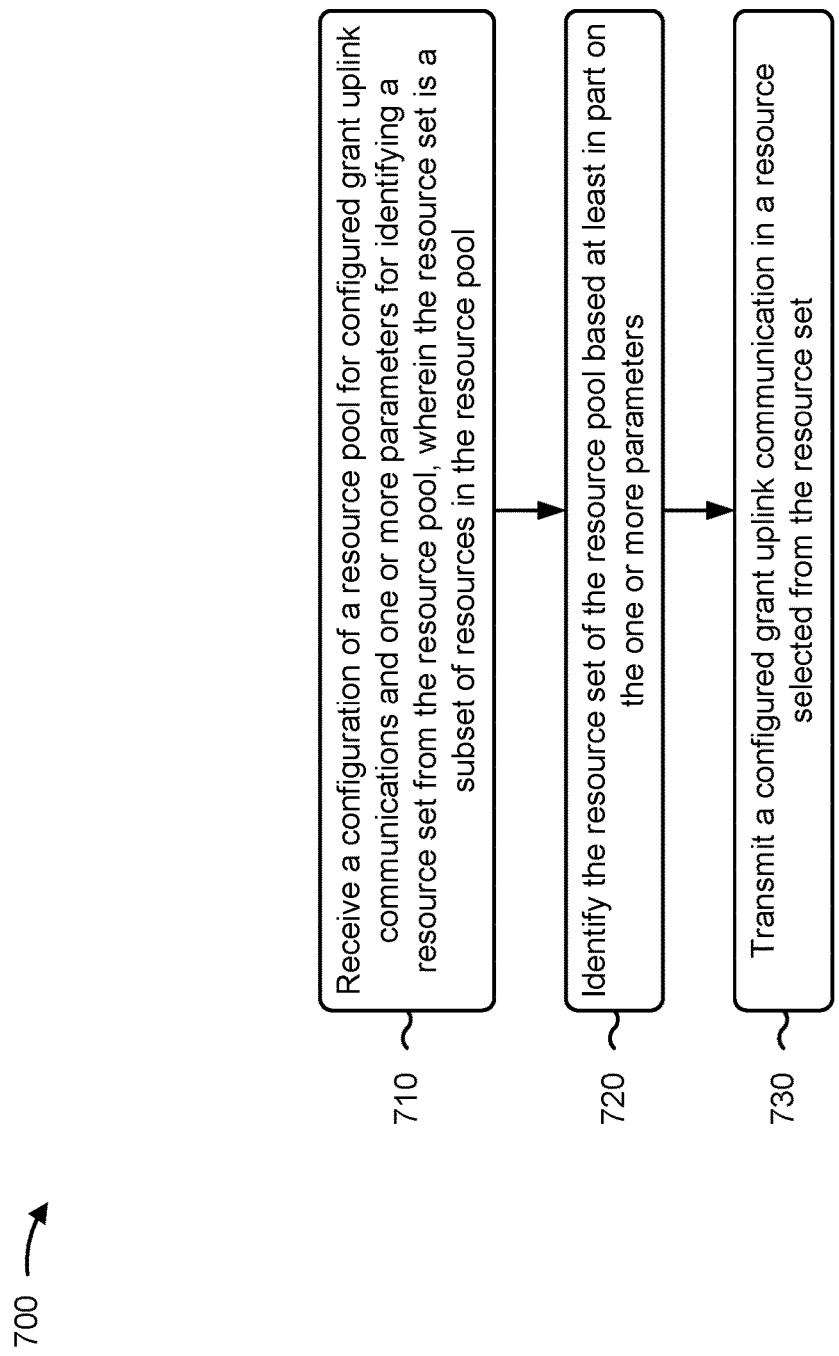
FIG. 7 is a diagram illustrating an example process performed, for example, by a UE, in accordance with the present disclosure.

FIG. 7 is a diagram illustrating an example process 700 performed, for example, by a UE, in accordance with the present disclosure. Example process 700 is an example where the UE (e.g., UE 120) performs operations associated with resource selection for aperiodic CG uplink communication.

As shown in FIG. 7, in some aspects, process 700 may include receiving a configuration of a resource pool for CG uplink communications and one or more parameters for identifying a resource set from the resource pool, wherein the resource set is a subset of resources in the resource pool (block 710). For example, the UE (e.g., using receive processor 258, transmit processor 264, controller/processor 280, and/or memory 282) may receive a configuration of a resource pool for CG uplink communications and one or more parameters for identifying a resource set from the resource pool, as described above. In some aspects, the resource set is a subset of resources in the resource pool.

As further shown in FIG. 7, in some aspects, process 700 may include identifying the resource set of the resource pool based at least in part on the one or more parameters (block 720). For example, the UE (e.g., using receive processor 258, transmit processor 264, controller/processor 280, and/or memory 282) may identify the resource set of the resource pool based at least in part on the one or more parameters, as described above.

As further shown in FIG. 7, in some aspects, process 700 may include transmitting a CG uplink communication in a resource selected from the resource set (block 730). For example, the UE (e.g., using receive processor 258, transmit processor 264, controller/processor 280, and/or memory 282) may transmit a CG uplink communication in a resource selected from the resource set, as described above.

Process 700 may include additional aspects, such as any single aspect or any combination of aspects described below and/or in connection with one or more other processes described elsewhere herein.

In a first aspect, the configuration indicates one or more bursts of resources in the resource pool.

In a second aspect, alone or in combination with the first aspect, the one or more parameters include at least one of: a start parameter that relates to a start time for the resource set, a length parameter that relates to a time length of the resource set, a resource quantity parameter that relates to a number of resources included in the resource set, or a combination thereof.

In a third aspect, alone or in combination with one or more of the first and second aspects, the start parameter indicates an offset between a triggering event and the start time for the resource set.

In a fourth aspect, alone or in combination with one or more of the first through third aspects, the triggering event is an arrival of traffic at the UE to be transmitted in the CG uplink communication.

In a fifth aspect, alone or in combination with one or more of the first through fourth aspects, the one or more parameters include the start parameter and the length parameter, and the resource set is identified as a subset of the resources in the resource pool in a time window with a start time determined based at least in part on the start parameter and a time length determined based at least in part on the length parameter.

In a sixth aspect, alone or in combination with one or more of the first through fifth aspects, the one or more parameters include the start parameter and the resource quantity parameter, and the resource set is identified as a subset of the resources in the resource pool in a time window with a start time determined based at least in part on the start parameter and a time length determined such that a number of resources in the resource set satisfies the resource quantity parameter.

In a seventh aspect, alone or in combination with one or more of the first through sixth aspects, the one or more parameters include the start parameter, the length parameter, and the resource quantity parameter, and the resource set is identified as one of: a first subset of the resources in the resource pool in a first time window with a start time determined based at least in part on the start parameter and a time length determined based at least in part on the length parameter, or a second subset of the resources in the resource pool in a second time window with a start time determined based at least in part on the start parameter and a time length determined such that a number of resources in the resource set satisfies the resource quantity parameter.

In an eighth aspect, alone or in combination with one or more of the first through seventh aspects, resource set is identified as the first subset based at least in part on a determination that a number of resources in the first subset does not satisfy the resource quantity parameter, and the resource set is identified as the second subset based at least in part on a determination that the number of resources in the first subset satisfies the resource quantity parameter.

In a ninth aspect, alone or in combination with one or more of the first through eighth aspects, the one or more parameters include the start parameter, the length parameter, a minimum resource quantity parameter, and a maximum resource quantity parameter, and the resource set is identified as a subset of the resources of the resource pool in a shifting time window with a start time determined based at least in part on the start parameter and a time length determined based at least in part on the length parameter, the minimum resource quantity parameter, and the maximum resource quantity parameter.

In a tenth aspect, alone or in combination with one or more of the first through ninth aspects, process 700 includes receiving an indication used to adjust at least one parameter of the one or more parameters.

In an eleventh aspect, alone or in combination with one or more of the first through tenth aspects, the indication is included in a GC-PDCCH communication.

In a twelfth aspect, alone or in combination with one or more of the first through eleventh aspects, the indication is used to adjust at least one of a start parameter, a length parameter, or a resource quantity parameter for identifying the resource set.

In a thirteenth aspect, alone or in combination with one or more of the first through twelfth aspects, the configuration indicates a time period after the UE accesses the resource pool and during which the UE cannot access the resource pool.

In a fourteenth aspect, alone or in combination with one or more of the first through thirteenth aspects, process 700 includes receiving an indication relating to a utilization level of the resource pool; and adjusting at least one parameter of the one or more parameters based at least in part on the indication.

In a fifteenth aspect, alone or in combination with one or more of the first through fourteenth aspects, the indication is included in a GC-PDCCH communication.

In a sixteenth aspect, alone or in combination with one or more of the first through fifteenth aspects, the indication is an indication that the resource pool is busy, and the at least one parameter is adjusted to increase a size of the resource set.

In a seventeenth aspect, alone or in combination with one or more of the first through sixteenth aspects, the indication is an indication that the resource pool is not busy, and the at least one parameter is adjusted to decrease a size of the resource set.

In an eighteenth aspect, alone or in combination with one or more of the first through seventeenth aspects, process 700 includes detecting a utilization level of the resource pool; and adjusting at least one parameter of the one or more parameters based at least in part on detecting the utilization level of the resource pool.

In a nineteenth aspect, alone or in combination with one or more of the first through eighteenth aspects, the utilization level of the resource pool is detected based at least in part on detecting transmissions of CG uplink communications in the resource pool by one or more other UEs, and performing blind detection to determine how many resources are used in the resource pool in a time window preceding identification of the resource set.

In a twentieth aspect, alone or in combination with one or more of the first through nineteenth aspects, a busy utilization level of the resource pool is detected and the at least one parameter is adjusted to increase a size of the resource set.

In a twenty first aspect, alone or in combination with one or more of the first through twentieth aspects, process 700 includes randomly selecting the resource for transmitting the CG uplink communication from the resource set.

In a twenty second aspect, alone or in combination with one or more of the first through twenty first aspects, the resources in the resource pool are at least one of time division multiplexed, frequency division multiplexed, code division multiplexed, or a combination thereof, from each other.

In a twenty third aspect, alone or in combination with one or more of the first through twenty second aspects, the resources in the resource pool are code division multiplexed with respect to each other with overlapping time and frequency resources separated in a spatial domain with at least one of different demodulation reference signal ports, different demodulation reference signal sequences, or a combination thereof.

In a twenty fourth aspect, alone or in combination with one or more of the first through twenty third aspects, the configuration of the resource pool is specific to the UE.

In a twenty fifth aspect, alone or in combination with one or more of the first through twenty fourth aspects, the resource pool is shared by the UE and one or more other UEs.

In a twenty sixth aspect, alone or in combination with one or more of the first through twenty fifth aspects, the resource pool is homogeneous to the UE with respect to transport block size, modulation and coding scheme, frequency domain resource size, time domain resource size, or a combination thereof.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
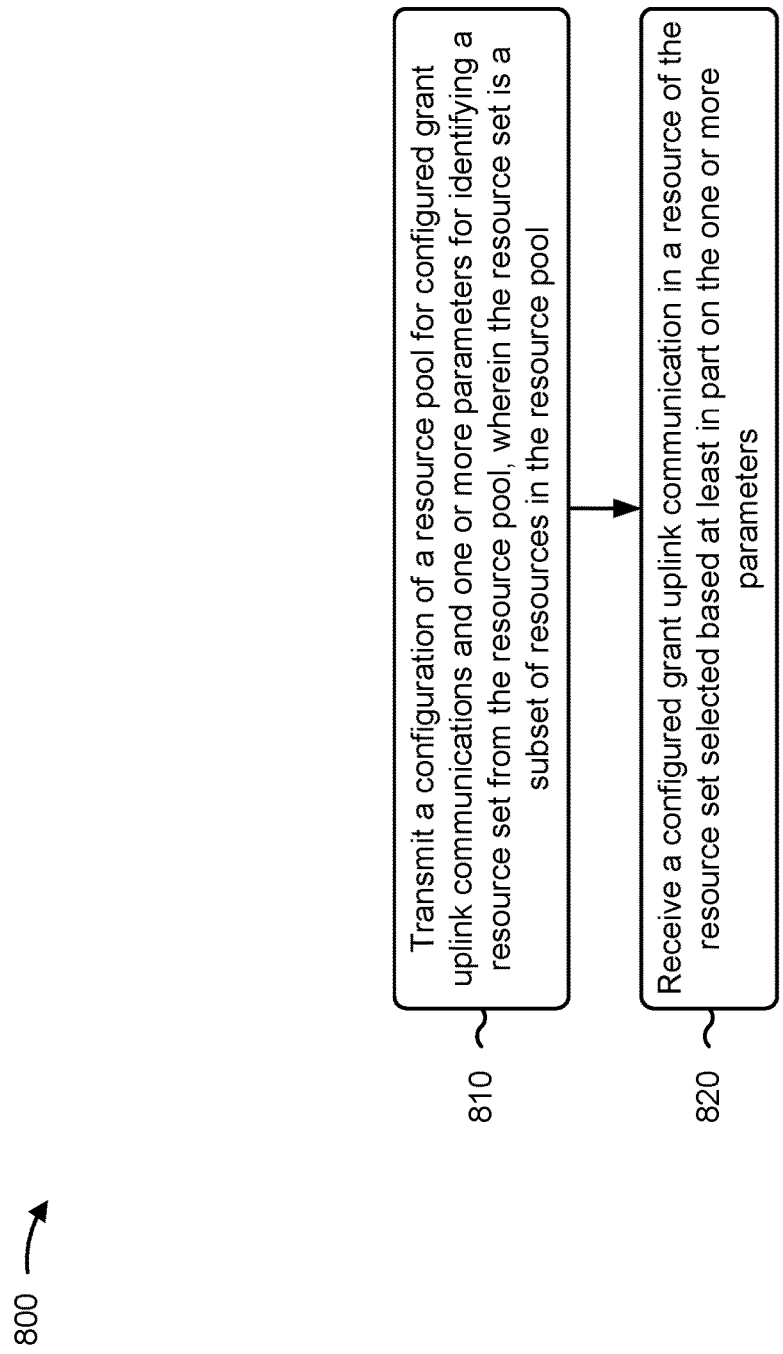
FIG. 8 is a diagram illustrating an example process performed, for example, by a base station, in accordance with the present disclosure.

FIG. 8 is a diagram illustrating an example process 800 performed, for example, by a base station, in accordance with present disclosure. Example process 800 is an example where the base station (e.g., base station 110) performs operations associated with resource selection for aperiodic CG uplink communication.

As shown in FIG. 8, in some aspects, process 800 may include transmitting, to a UE, a configuration of a resource pool for CG uplink communications and one or more parameters for identifying a resource set from the resource pool, wherein the resource set is a subset of resources in the resource pool (block 810). For example, the base station (e.g., using transmit processor 220, receive processor 238, controller/processor 240, and/or memory 242) may transmit, to a user equipment (UE), a configuration of a resource pool for CG uplink communications and one or more parameters for identifying a resource set from the resource pool, as described above. In some aspects, the resource set is a subset of resources in the resource pool.

As further shown in FIG. 8, in some aspects, process 800 may include receiving, from the UE, a CG uplink communication in a resource of the resource set identified based at least in part on the one or more parameters (block 820). For example, the base station (e.g., using transmit processor 220, receive processor 238, controller/processor 240, and/or memory 242) may receive, from the UE, a CG uplink communication in a resource of the resource set identified based at least in part on the one or more parameters, as described above.

Process 800 may include additional aspects, such as any single aspect or any combination of aspects described below and/or in connection with one or more other processes described elsewhere herein.

In a first aspect, the configuration indicates one or more bursts of resources in the resource pool.

In a second aspect, alone or in combination with the first aspect, the one or more parameters include at least one of: a start parameter that relates to a start time for the resource set, a length parameter that relates to a time length of the resource set, a resource quantity parameter that relates to a number of resources included in the resource set, or a combination thereof.

In a third aspect, alone or in combination with one or more of the first and second aspects, the start parameter indicates an offset between a triggering event and the start time for the resource set.

In a fourth aspect, alone or in combination with one or more of the first through third aspects, the triggering event is an arrival of traffic at the UE to be transmitted in the CG uplink communication.

In a fifth aspect, alone or in combination with one or more of the first through fourth aspects, the one or more parameters include the start parameter and the length parameter, and the resource set is identified as a subset of the resources in the resource pool in a time window with a start time determined based at least in part on the start parameter and a time length determined based at least in part on the length parameter.

In a sixth aspect, alone or in combination with one or more of the first through fifth aspects, the one or more parameters include the start parameter and the resource quantity parameter, and the resource set is identified as a subset of the resources in the resource pool in a time window with a start time determined based at least in part on the start parameter and a time length determined such that a number of resources in the resource set satisfies the resource quantity parameter.

In a seventh aspect, alone or in combination with one or more of the first through sixth aspects, the one or more parameters include the start parameter, the length parameter, and the resource quantity parameter, and the resource set is identified as one of: a first subset of the resources in the resource pool in a first time window with a start time determined based at least in part on the start parameter and a time length determined based at least in part on the length parameter, or a second subset of the resources in the resource pool in a second time window with a start time determined based at least in part on the start parameter and a time length determined such that a number of resources in the resource set satisfies the resource quantity parameter.

In an eighth aspect, alone or in combination with one or more of the first through seventh aspects, resource set is identified as the first subset based at least in part on a determination that a number of resources in the first subset does not satisfy the resource quantity parameter, and the resource set is identified as the second subset based at least in part on a determination that the number of resources in the first subset satisfies the resource quantity parameter.

In a ninth aspect, alone or in combination with one or more of the first through eighth aspects, the one or more parameters include the start parameter, the length parameter, a minimum resource quantity parameter, and a maximum resource quantity parameter, and the resource set is identified as a subset of the resources of the resource pool in a shifting time window with a start time determined based at least in part on the start parameter and a time length determined based at least in part on the length parameter, the minimum resource quantity parameter, and the maximum resource quantity parameter.

In a tenth aspect, alone or in combination with one or more of the first through ninth aspects, process 800 includes transmitting, to the UE, an indication to adjust at least one parameter of the one or more parameters for identifying the resource set for the UE.

In an eleventh aspect, alone or in combination with one or more of the first through tenth aspects, the indication is transmitted based at least in part on a determination of a utilization level of the resource pool.

In a twelfth aspect, alone or in combination with one or more of the first through eleventh aspects, the indication is included in a GC-PDCCH communication.

In a thirteenth aspect, alone or in combination with one or more of the first through twelfth aspects, the indication is an indication to adjust at least one of a start parameter, a length parameter, or a resource quantity parameter for identifying the resource set.

In a fourteenth aspect, alone or in combination with one or more of the first through thirteenth aspects, the configuration indicates a time period after the UE accesses the resource pool and during which the UE cannot access the resource pool.

In a fifteenth aspect, alone or in combination with one or more of the first through fourteenth aspects, process 800 includes transmitting, to the UE, an indication relating to a utilization level of the resource pool.

In a sixteenth aspect, alone or in combination with one or more of the first through fifteenth aspects, the indication is transmitted based at least in part on a determination of the utilization level of the resource pool.

In a seventeenth aspect, alone or in combination with one or more of the first through sixteenth aspects, the indication is included in a GC-PDCCH communication.

In an eighteenth aspect, alone or in combination with one or more of the first through seventeenth aspects, the indication is an indication that the resource pool is busy.

In a nineteenth aspect, alone or in combination with one or more of the first through eighteenth aspects, the indication is an indication that the resource pool is not busy.

In a twentieth aspect, alone or in combination with one or more of the first through nineteenth aspects, the resources in the resource pool are at least one of time division multiplexed, frequency division multiplexed, code division multiplexed, or a combination thereof, from each other.

In a twenty first aspect, alone or in combination with one or more of the first through twentieth aspects, the resources in the resource pool are code division multiplexed with respect to each other with overlapping time and frequency resources separated in a spatial domain with at least one of different demodulation reference signal ports, different demodulation reference signal sequences, or a combination thereof.

In a twenty second aspect, alone or in combination with one or more of the first through twenty first aspects, the configuration of the resource pool is specific to the UE.

In a twenty third aspect, alone or in combination with one or more of the first through twenty second aspects, the resource pool is shared by the UE and one or more other UEs.

In a twenty fourth aspect, alone or in combination with one or more of the first through twenty third aspects, the resource pool is homogeneous to the UE with respect to transport block size, modulation and coding scheme, frequency domain resource size, time domain resource size, or a combination thereof.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

The following provides an overview of some Aspects of the present disclosure:

Aspect 1: A method of wireless communication performed by a user equipment (UE), comprising: receiving a configuration of a resource pool for configured grant uplink communications and one or more parameters for identifying a resource set from the resource pool, wherein the resource set is a subset of resources in the resource pool; identifying the resource set of the resource pool based at least in part on the one or more parameters; and transmitting a configured grant uplink communication in a resource selected from the resource set.

Aspect 2: The method of Aspect 1, wherein the configuration indicates one or more bursts of resources in the resource pool.

Aspect 3: The method of any of Aspects 1-2, wherein the one or more parameters include at least one of: a start parameter that relates to a start time for the resource set, a length parameter that relates to a time length of the resource set, a resource quantity parameter that relates to a number of resources included in the resource set, or a combination thereof.

Aspect 4: The method of Aspect 3, wherein the start parameter indicates an offset between a triggering event and the start time for the resource set.

Aspect 5: The method of Aspect 4, wherein the triggering event is an arrival of traffic at the UE to be transmitted in the configured grant uplink communication.

Aspect 6: The method of any of Aspects 3-5, wherein the one or more parameters include the start parameter and the length parameter, and the resource set is identified as a subset of the resources in the resource pool in a time window with a start time determined based at least in part on the start parameter and a time length determined based at least in part on the length parameter.

Aspect 7: The method of any of Aspects 3-5, wherein the one or more parameters include the start parameter and the resource quantity parameter, and the resource set is identified as a subset of the resources in the resource pool in a time window with a start time determined based at least in part on the start parameter and a time length determined such that a number of resources in the resource set satisfies the resource quantity parameter.

Aspect 8: The method of any of Aspects 3-5, wherein the one or more parameters include the start parameter, the length parameter, and the resource quantity parameter, and the resource set is identified as one of: a first subset of the resources in the resource pool in a first time window with a start time determined based at least in part on the start parameter and a time length determined based at least in part on the length parameter, or a second subset of the resources in the resource pool in a second time window with a start time determined based at least in part on the start parameter and a time length determined such that a number of resources in the resource set satisfies the resource quantity parameter.

Aspect 9: The method of Aspect 8, wherein resource set is identified as the first subset based at least in part on a determination that a number of resources in the first subset does not satisfy the resource quantity parameter, and the resource set is identified as the second subset based at least in part on a determination that the number of resources in the first subset satisfies the resource quantity parameter.

Aspect 10: The method of any of Aspects 3-5, wherein the one or more parameters include the start parameter, the length parameter, a minimum resource quantity parameter, and a maximum resource quantity parameter, and the resource set is identified as a subset of the resources of the resource pool in a shifting time window with a start time determined based at least in part on the start parameter and a time length determined based at least in part on the length parameter, the minimum resource quantity parameter, and the maximum resource quantity parameter.

Aspect 11: The method of any of Aspects 1-10, further comprising: receiving an indication used to adjust at least one parameter of the one or more parameters.

Aspect 12: The method of Aspect 11, wherein the indication is included in a group common physical downlink control channel communication.

Aspect 13: The method of any of Aspects 11-12, wherein the indication is used to adjust at least one of a start parameter, a length parameter, or a resource quantity parameter for identifying the resource set.

Aspect 14: The method of any of Aspects 1-13, wherein the configuration indicates a time period after the UE accesses the resource pool and during which the UE cannot access the resource pool.

Aspect 15: The method of any of Aspects 1-14, further comprising: receiving an indication relating to a utilization level of the resource pool; and adjusting at least one parameter of the one or more parameters based at least in part on the indication.

Aspect 16: The method of Aspect 15, wherein the indication is included in a group common physical downlink control channel communication.

Aspect 17: The method of any of Aspects 15-16, wherein the indication is an indication that the resource pool is busy, and the at least one parameter is adjusted to increase a size of the resource set.

Aspect 18: The method of any of Aspects 15-16, wherein the indication is an indication that the resource pool is not busy, and the at least one parameter is adjusted to decrease a size of the resource set.

Aspect 19: The method of any of Aspects 1-18, further comprising: detecting a utilization level of the resource pool; and adjusting at least one parameter of the one or more parameters based at least in part on detecting the utilization level of the resource pool.

Aspect 20: The method of Aspect 19, wherein the utilization level of the resource pool is detected based at least in part on detecting transmissions of configured grant uplink communications in the resource pool by one or more other UEs, and performing blind detection to determine how many resources are used in the resource pool in a time window preceding identification of the resource set.

Aspect 21: The method of any of Aspects 19-20, wherein a busy utilization level of the resource pool is detected and the at least one parameter is adjusted to increase a size of the resource set.

Aspect 22: The method of any of Aspects 1-21, further comprising: randomly selecting the resource for transmitting the configured grant uplink communication from the resource set.

Aspect 23: The method of any of Aspects 1-22, wherein the resources in the resource pool are at least one of time division multiplexed, frequency division multiplexed, code division multiplexed, or a combination thereof, from each other.

Aspect 24: The method of any of Aspects 1-23, wherein the resources in the resource pool are code division multiplexed with respect to each other with overlapping time and frequency resources separated in a spatial domain with at least one of different demodulation reference signal ports, different demodulation reference signal sequences, or a combination thereof.

Aspect 25: The method of any of Aspects 1-24, wherein the configuration of the resource pool is specific to the UE.

Aspect 26: The method of any of Aspects 1-25, wherein the resource pool is shared by the UE and one or more other UEs.

Aspect 27: The method of any of Aspects 1-26, wherein the resource pool is homogeneous to the UE with respect to transport block size, modulation and coding scheme, frequency domain resource size, time domain resource size, or a combination thereof.

Aspect 28: A method of wireless communication performed by a base station, comprising: transmitting, to a user equipment (UE), a configuration of a resource pool for configured grant uplink communications and one or more parameters for identifying a resource set from the resource pool, wherein the resource set is a subset of resources in the resource pool; and receiving, from the UE, a configured grant uplink communication in a resource of the resource set identified based at least in part on the one or more parameters.

Aspect 29: The method of Aspect 28, wherein the configuration indicates one or more bursts of resources in the resource pool.

Aspect 30: The method of any of Aspects 28-29, wherein the one or more parameters include at least one of: a start parameter that relates to a start time for the resource set, a length parameter that relates to a time length of the resource set, a resource quantity parameter that relates to a number of resources included in the resource set, or a combination thereof.

Aspect 31: The method of Aspect 30, wherein the start parameter indicates an offset between a triggering event and the start time for the resource set.

Aspect 32: The method of Aspect 31, wherein the triggering event is an arrival of traffic at the UE to be transmitted in the configured grant uplink communication.

Aspect 33: The method of any of Aspects 30-32, wherein the one or more parameters include the start parameter and the length parameter, and the resource set is identified as a subset of the resources in the resource pool in a time window with a start time determined based at least in part on the start parameter and a time length determined based at least in part on the length parameter.

Aspect 34: The method of any of Aspects 30-32, wherein the one or more parameters include the start parameter and the resource quantity parameter, and the resource set is identified as a subset of the resources in the resource pool in a time window with a start time determined based at least in part on the start parameter and a time length determined such that a number of resources in the resource set satisfies the resource quantity parameter.

Aspect 35: The method of any of Aspects 30-32, wherein the one or more parameters include the start parameter, the length parameter, and the resource quantity parameter, and the resource set is identified as one of: a first subset of the resources in the resource pool in a first time window with a start time determined based at least in part on the start parameter and a time length determined based at least in part on the length parameter, or a second subset of the resources in the resource pool in a second time window with a start time determined based at least in part on the start parameter and a time length determined such that a number of resources in the resource set satisfies the resource quantity parameter.

Aspect 36: The method of Aspect 35, wherein resource set is identified as the first subset based at least in part on a determination that a number of resources in the first subset does not satisfy the resource quantity parameter, and the resource set is identified as the second subset based at least in part on a determination that the number of resources in the first subset satisfies the resource quantity parameter.

Aspect 37: The method of any of Aspects 30-32, wherein the one or more parameters include the start parameter, the length parameter, a minimum resource quantity parameter, and a maximum resource quantity parameter, and the resource set is identified as a subset of the resources of the resource pool in a shifting time window with a start time determined based at least in part on the start parameter and a time length determined based at least in part on the length parameter, the minimum resource quantity parameter, and the maximum resource quantity parameter.

Aspect 38: The method of any of Aspects 28-37, further comprising: transmitting, to the UE, an indication to adjust at least one parameter of the one or more parameters for identifying the resource set for the UE.

Aspect 39: The method of Aspect 38, wherein the indication is transmitted based at least in part on a determination of a utilization level of the resource pool.

Aspect 40: The method of any of Aspects 38-39, wherein the indication is included in a group common physical downlink control channel communication.

Aspect 41: The method of any of Aspects 38-40, wherein the indication is an indication to adjust at least one of a start parameter, a length parameter, or a resource quantity parameter for identifying the resource set.

Aspect 42: The method of any of Aspects 28-41, wherein the configuration indicates a time period after the UE accesses the resource pool and during which the UE cannot access the resource pool.

Aspect 43: The method of any of Aspects 28-42, further comprising: transmitting, to the UE, an indication relating to a utilization level of the resource pool.

Aspect 44: The method of Aspect 43, wherein the indication is transmitted based at least in part on a determination of the utilization level of the resource pool.

Aspect 45: The method of any of Aspects 43-44, wherein the indication is included in a group common physical downlink control channel communication.

Aspect 46: The method of any of Aspects 43-45, wherein the indication is an indication that the resource pool is busy.

Aspect 47: The method of any of Aspects 43-45, wherein the indication is an indication that the resource pool is not busy.

Aspect 48: The method of any of Aspects 28-47, wherein the resources in the resource pool are at least one of time division multiplexed, frequency division multiplexed, code division multiplexed, or a combination thereof, from each other.

Aspect 49: The method of any of Aspects 28-48, wherein the resources in the resource pool are code division multiplexed with respect to each other with overlapping time and frequency resources separated in a spatial domain with at least one of different demodulation reference signal ports, different demodulation reference signal sequences, or a combination thereof.

Aspect 50: The method of any of Aspects 28-49, wherein the configuration of the resource pool is specific to the UE.

Aspect 51: The method of any of Aspects 28-50, wherein the resource pool is shared by the UE and one or more other UEs.

Aspect 52: The method of any of Aspects 28-51, wherein the resource pool is homogeneous to the UE with respect to transport block size, modulation and coding scheme, frequency domain resource size, time domain resource size, or a combination thereof.

Aspect 53: An apparatus for wireless communication at a device, comprising a processor; memory coupled with the processor; and instructions stored in the memory and executable by the processor to cause the apparatus to perform the method of one or more of Aspects 1-27.

Aspect 54: An apparatus for wireless communication at a device, comprising a processor; memory coupled with the processor; and instructions stored in the memory and executable by the processor to cause the apparatus to perform the method of one or more of Aspects 28-52.

Aspect 55: A device for wireless communication, comprising a memory and one or more processors coupled to the memory, the one or more processors configured to perform the method of one or more of Aspects 1-27.

Aspect 56: A device for wireless communication, comprising a memory and one or more processors coupled to the memory, the one or more processors configured to perform the method of one or more of Aspects 28-52.

Aspect 57: An apparatus for wireless communication, comprising at least one means for performing the method of one or more of Aspects 1-27.

Aspect 58: An apparatus for wireless communication, comprising at least one means for performing the method of one or more of Aspects 28-52.

Aspect 59: A non-transitory computer-readable medium storing code for wireless communication, the code comprising instructions executable by a processor to perform the method of one or more of Aspects 1-27.

Aspect 60: A non-transitory computer-readable medium storing code for wireless communication, the code comprising instructions executable by a processor to perform the method of one or more of Aspects 28-52.

Aspect 61: A non-transitory computer-readable medium storing a set of instructions for wireless communication, the set of instructions comprising one or more instructions that, when executed by one or more processors of a device, cause the device to perform the method of one or more of Aspects 1-27.

Aspect 62: A non-transitory computer-readable medium storing a set of instructions for wireless communication, the set of instructions comprising one or more instructions that, when executed by one or more processors of a device, cause the device to perform the method of one or more of Aspects 28-52.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
receiving a configuration of a resource pool for configured grant uplink communications wherein the configuration comprises an indication of one or more parameters for identifying a resource set from the resource pool, wherein the resource set is a subset of resources in the resource pool, and wherein the one or more parameters include a start parameter that indicates an offset to a start time for the resource set, a length parameter that indicates a time length of the resource set, and a resource quantity parameter that indicates a number of resources included in the resource set, wherein the resource quantity parameter comprises a minimum resource quantity parameter indicating a minimum number of resources in the resource set, and a maximum resource quantity parameter indicating a maximum number of resources in the resource set;
identifying the resource set of the resource pool in a shifting time window with a start time determined based at least in part on the start parameter and a time length determined based at least in part on the length parameter, the minimum resource quantity parameter, and the maximum resource quantity parameter; and
transmitting a configured grant uplink communication in a resource selected from the resource set.

2. The method of claim 1, wherein the configuration indicates one or more bursts of resources in the resource pool.

3. The method of claim 1, wherein identifying the resource set of the resource pool comprises:

identifying the resource set as the subset of the resources in the resource pool in the shifting time window with the start time determined based at least in part on the start parameter and the time length determined such that a number of resources in the resource set satisfies the resource quantity parameter comprising the minimum resource quantity parameter and the maximum resource quantity parameter.

4. The method of claim 1, wherein identifying the resource set of the resource pool comprises:
identifying, based at least in part on a determination that a number of resources in a first subset does not satisfy the resource quantity parameter, the resource set as the first subset in the resource pool in a first time window with a start time determined based at least in part on the start parameter and a time length determined based at least in part on the length parameter, and identifying, based at least in part on a determination that the number of resources in the first subset satisfies the resource quantity parameter, the resource set as the second subset in the resource pool in a second time window with a start time determined based at least in part on the start parameter and a time length determined such that a number of resources in the resource set satisfies the resource quantity parameter.

5. The method of claim 1, further comprising:
receiving an indication used to adjust at least one parameter of the one or more parameters.

6. The method of claim 1, wherein the configuration indicates a time period after the UE accesses the resource pool and during which the UE cannot access the resource pool.

7. The method of claim 1, further comprising:
receiving an indication relating to a utilization level of the resource pool; and
adjusting at least one parameter of the one or more parameters based at least in part on the indication.

8. The method of claim 1, further comprising:
detecting a utilization level of the resource pool; and
adjusting at least one parameter of the one or more parameters based at least in part on detecting the utilization level of the resource pool.

9. The method of claim 8, wherein the utilization level of the resource pool is detected based at least in part on detecting transmissions of configured grant uplink communications in the resource pool by one or more other UEs, and performing blind detection to determine how many resources are used in the resource pool in a time window preceding identification of the resource set.

10. The method of claim 1, further comprising:
randomly selecting the resource for transmitting the configured grant uplink communication from the resource set.

11. The method of claim 1, wherein the resources in the resource pool are at least one of time division multiplexed, frequency division multiplexed, or code division multiplexed, from each other, wherein the configuration of the resource pool is specific to the UE and the resource pool is homogeneous to the UE with respect to at least one of transport block size, modulation and coding scheme, frequency domain resource size, or time domain resource size, and wherein the resource pool is shared by the UE and one or more other UEs.

12. A user equipment (UE) for wireless communication, comprising:
a memory; and
one or more processors coupled to the memory, the one or more processors, individually or collectively, configured to:
receive a configuration of a resource pool for configured grant uplink communications wherein the configuration comprises an indication of one or more parameters for identifying a resource set from the resource pool, wherein the resource set is a subset of resources in the resource pool, and wherein the one or more parameters include a start parameter that indicates an offset to a start time for the resource set, a length parameter that indicates a time length of the resource set, and a resource quantity parameter that indicates a number of resources included in the resource set, wherein the resource quantity parameter comprises a minimum resource quantity parameter indicating a minimum number of resources in the resource set, and a maximum resource quantity parameter indicating a maximum number of resources in the resource set;
identify the resource set of the resource pool in a shifting time window with a start time determined based at least in part on the start parameter and a time length determined based at least in part on the length parameter, the minimum resource quantity parameter, and the maximum resource quantity parameter; and
transmit a configured grant uplink communication in a resource selected from the resource set.

13. The UE of claim 12, wherein the configuration indicates one or more bursts of resources in the resource pool.

14. The UE of claim 12, wherein to identify the resource set of the resource pool, the one or more processors, individually or collectively, are further configured to identify the resource set as the subset of the resources in the resource pool in the time window with the start time determined based at least in part on the start parameter and the time length determined such that a number of resources in the resource set satisfies the resource quantity parameter comprising the minimum resource quantity parameter and the maximum resource quantity parameter.

15. The UE of claim 12, wherein to identify the resource set of the resource pool, the one or more processors, individually or collectively, are further configured to identify, based at least in part on a determination that a number of resources in a first subset does not satisfy the resource quantity parameter, the resource set as the first subset of the resources in the resource pool in a first time window with a start time determined based at least in part on the start parameter and a time length determined based at least in part on the length parameter, and identify, based at least in part on a determination that the number of resources in the first subset satisfies the resource quantity parameter, the resource set as the second subset of the resources in the resource pool in a second time window with a start time determined based at least in part on the start parameter and a time length determined such that a number of resources in the resource set satisfies the resource quantity parameter.

16. The UE of claim 12, wherein the one or more processors, individually or collectively, are further configured to:
receive an indication used to adjust at least one parameter of the one or more parameters.

17. The UE of claim 12, wherein the configuration indicates a time period after the UE accesses the resource pool and during which the UE cannot access the resource pool.

18. The UE of claim 12, wherein the one or more processors, individually or collectively, are further configured to:
receive an indication relating to a utilization level of the resource pool; and
adjust at least one parameter of the one or more parameters based at least in part on the indication.

19. The UE of claim 12, wherein the one or more processors, individually or collectively, are further configured to:
detect a utilization level of the resource pool; and
adjust at least one parameter of the one or more parameters based at least in part on detecting the utilization level of the resource pool.

20. The UE of claim 19, wherein the utilization level of the resource pool is detected based at least in part on detecting transmissions of configured grant uplink communications in the resource pool by one or more other UEs, and performing blind detection to determine how many resources are used in the resource pool in a time window preceding identification of the resource set.

21. The UE of claim 12, wherein the one or more processors, individually or collectively, are further configured to:
randomly select the resource for transmitting the configured grant uplink communication from the resource set.

22. The UE of claim 12, wherein the resources in the resource pool are at least one of time division multiplexed, frequency division multiplexed, or code division multiplexed, from each other, wherein the configuration of the resource pool is specific to the UE and the resource pool is homogeneous to the UE with respect to at least one of transport block size, modulation and coding scheme, frequency domain resource size, or time domain resource size, and wherein the resource pool is shared by the UE and one or more other UEs.

23. A non-transitory computer-readable medium storing a set of instructions for wireless communication, the set of instructions comprising:
one or more instructions that, when executed by one or more processors of a user equipment (UE), cause the UE to:
receive a configuration of a resource pool for configured grant uplink communications wherein the configuration comprises an indication of one or more parameters for identifying a resource set from the resource pool, wherein the resource set is a subset of resources in the resource pool, and wherein the one or more parameters include a start parameter that indicates an offset to a start time for the resource set, a length parameter that indicates a time length of the resource set, and a resource quantity parameter that indicates a number of resources included in the resource set, wherein the resource quantity parameter comprises a minimum resource quantity parameter indicating a minimum number of resources in the resource set, and a maximum resource quantity parameter indicating a maximum number of resources in the resource set;
identify the resource set of the resource pool in a shifting time window with a start time determined based at least in part on the start parameter and a time length determined based at least in part on the length parameter, the minimum resource quantity parameter, and the maximum resource quantity parameter; and
transmit a configured grant uplink communication in a resource selected from the resource set.

24. An apparatus for wireless communication, comprising:
means for receiving a configuration of a resource pool for configured grant uplink communications wherein the configuration comprises an indication of one or more parameters for identifying a resource set from the resource pool, wherein the resource set is a subset of resources in the resource pool, and wherein the one or more parameters include a start parameter that indicates an offset to a start time for the resource set, a length parameter that indicates a time length of the resource set, and a resource quantity parameter that indicates a number of resources included in the resource set, wherein the resource quantity parameter comprises a minimum resource quantity parameter indicating a minimum number of resources in the resource set, and a maximum resource quantity parameter indicating a maximum number of resources in the resource set;
means for identifying the resource set of the resource pool in a shifting time window with a start time determined based at least in part on the start parameter and a time length determined based at least in part on the length parameter, the minimum resource quantity parameter, and the maximum resource quantity parameter; and
means for transmitting a configured grant uplink communication in a resource selected from the resource set.

* * * * *